United States Patent
Hisamitsu et al.

(10) Patent No.: US 10,281,619 B2
(45) Date of Patent: May 7, 2019

(54) LAMINATED FILM AND METHOD OF PRODUCING THE SAME

(71) Applicant: Konica Minolta, Inc., Tokyo (JP)

(72) Inventors: Akihito Hisamitsu, Kanagawa (JP); Shota Hatazawa, Tokyo (JP); Taro Konuma, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 326 days.

(21) Appl. No.: 15/122,194

(22) PCT Filed: Mar. 4, 2015

(86) PCT No.: PCT/JP2015/056414
§ 371 (c)(1),
(2) Date: Aug. 29, 2016

(87) PCT Pub. No.: WO2015/133542
PCT Pub. Date: Sep. 11, 2015

(65) Prior Publication Data
US 2016/0370507 A1    Dec. 22, 2016

(30) Foreign Application Priority Data

Mar. 6, 2014 (JP) ................................. 2014-043933

(51) Int. Cl.
*G02B 1/14* (2015.01)
*G02B 1/111* (2015.01)
*G02B 5/28* (2006.01)

(52) U.S. Cl.
CPC ............... *G02B 1/14* (2015.01); *G02B 1/111* (2013.01); *G02B 5/287* (2013.01); *B32B 2255/26* (2013.01); *B32B 2419/00* (2013.01); *B32B 2605/00* (2013.01)

(58) Field of Classification Search
None
See application file for complete search history.

(56) References Cited

U.S. PATENT DOCUMENTS

2009/0142562 A1* 6/2009 Miyagawa ................ B32B 7/02
428/212

FOREIGN PATENT DOCUMENTS

| CN | 101389981 A | 3/2009 |
| WO | 2012014607 A1 | 2/2012 |

OTHER PUBLICATIONS

International Search Report issued in corresponding application No. PCT/JP2015/056414 dated May 12, 2015 (5 pages).
Written Opinion of the International Searching Authority issued in corresponding application No. PCT/JP2015/056414 dated May 12, 2015 (4 pages).
Office Action in corresponding Chinese Patent Application No. 201580011584.5 dated Feb. 4, 2017, with translation (18 pages).

* cited by examiner

*Primary Examiner* — Sheeba Ahmed
(74) *Attorney, Agent, or Firm* — Osha Liang LLP

(57) ABSTRACT

Provided is means that enables a hard coat layer to resist cracking and to have improved scratch resistance in a laminated film including a substrate, a surfactant-containing layer on one surface of the substrate, and the hard coat layer on the other surface of the substrate.
The laminated film includes a substrate, a surfactant-containing layer that is disposed on one surface of the substrate and contains a surfactant, and a hard coat layer disposed on the other surface of the substrate, wherein the hard coat layer contains 0.001 to 3% by weight of a (meth)acrylic modified silicone compound.

14 Claims, No Drawings

LAMINATED FILM AND METHOD OF PRODUCING THE SAME

TECHNICAL FIELD

The present invention relates to a laminated film and a method of producing the laminated film.

BACKGROUND ART

It is generally known that a dielectric multilayer coating film having a stack of high and low refractive index layers each formed with a controlled optical thickness on the surface of a substrate can selectively reflect light with a specific wavelength (see, for example, WO 2012/014607 A). Such a dielectric multilayer coating film is used, for example, as a heat ray shielding film on building windows and vehicle components. Such a heat ray shielding film can transmit visible rays and selectively block near infrared rays. The reflection wavelength of such a heat ray shielding film can be controlled only by controlling the thickness and refractive index of each layer, and therefore, such a heat ray shielding film can also reflect ultraviolet or visible light.

When such a dielectric multilayer coating and other laminated films are formed, a surfactant for functioning as a leveling agent or a lubricant is often added to a functional layer (e.g., the dielectric multilayer coating) provided on the surface of a substrate.

On the other hand, some of the laminated films are provided with a hard coat layer for purposes such as improving the scratch resistance of the films.

SUMMARY OF INVENTION

Under the circumstances, the inventors have conducted a study on a laminated film including a substrate, a surfactant-containing functional layer (hereinafter also referred to as a "surfactant-containing layer"), such as a dielectric multilayer coating, provided on one surface of the substrate, and a hard coat layer provided on the other surface of the substrate. In the process of the study, the inventors have also found that in some laminated films having the structure mentioned above, the hard coat layer is cracked or does not have sufficient scratch resistance.

One or more embodiments provide means that enables a hard coat layer to resist cracking and to have improved scratch resistance in a laminated film including a substrate, a surfactant-containing layer provided on one surface of the substrate, and the hard coat layer provided on the other surface of the substrate.

The inventors have conducted intensive studies. As a result, the inventors have found that a specific amount of a (meth)acrylic modified silicone compound is added to the hard coat layer.

Specifically, One or more embodiments are achieved by the following means:

1. A laminated film including: a substrate; a surfactant-containing layer that is disposed on one surface of the substrate and contains a surfactant; and a hard coat layer disposed on another surface of the substrate, wherein the hard coat layer contains 0.001 to 3% by weight of a (meth)acrylic modified silicone compound;

2. The laminated film according to Item. 1, wherein the surfactant is one or more selected from the group consisting of a long chain alkyl group-containing surfactant, a silicon-based surfactant, and a fluorosurfactant;

3. The laminated film according to Item. 1 or 2, wherein the surfactant-containing layer contains a water-soluble resin;

4. The laminated film according to any one of Items. 1 to 3, wherein the hard coat layer includes a product formed by applying an organic solvent-containing coating liquid and then drying the coating;

5. The laminated film according to any one of Items. 1 to 4, wherein the hard coat layer contains inorganic nanoparticles;

6. The laminated film according to Item. 5, wherein the inorganic nanoparticles include one or more selected from the group consisting of ATO, ITO, cesium-doped tungsten oxide, gallium zinc oxide, aluminum zinc oxide, and zinc antimonate;

7. The laminated film according to Item. 5 or 6, wherein the hard coat layer contains 10 to 80% by weight of the inorganic nanoparticles;

8. The laminated film according to any one of Items. 1 to 7, wherein the hard coat layer includes a resin component, and a hydroxyl group-containing urethane acrylate makes up 50% by weight or more of the resin component being 100% by weight;

9. The laminated film according to any one of Items. 1 to 8, wherein the surfactant-containing layer is a dielectric multilayer coating including a stack of alternating low and high refractive index layers; and 10. A method of producing a laminated film, the method including the steps of: forming a surfactant-containing layer on one surface of a substrate to obtain a first laminate; winding the first laminate into a roll; unwinding the roll of the first laminate; applying a coating liquid to a surface of the substrate opposite to its surface on which the surfactant-containing layer is formed in the first laminate, wherein the coating liquid contains 0.001 to 3% by weight of a (meth)acrylic modified silicone compound based on 100% by weight of solids in the coating liquid; and drying the coating to form a hard coat layer, so that a laminated film is obtained.

DESCRIPTION OF EMBODIMENTS

An aspect of embodiments of the present invention is directed to a laminated film including a substrate, a surfactant-containing layer that is disposed on one surface of the substrate and contains a surfactant, and a hard coat layer disposed on the other surface of the substrate, wherein the hard coat layer contains 0.001 to 3% by weight of a (meth)acrylic modified silicone compound. In the laminated film according to an aspect of embodiments of the present invention having such features, the hard coat layer resists cracking and has improved scratch resistance.

In conventional technologies, hard coat layers can be cracked or fail to have sufficient scratch resistance. In this regard, first, the inventors have concluded that this was caused by the fact that a surfactant is deposited from a surfactant-containing layer onto some parts of the surface of a substrate where the hard coat layer is to be formed. Specifically, if, for example, due to process contamination, a surfactant is deposited on the surface of a substrate where the hard coat layer is to be formed, the surface energy of the deposition site can extremely differ from that of its surroundings. This can make it difficult to ensure that the substrate surface where the hard coat layer is to be formed is wet uniformly. As a result, coating defects can occur, such as local cissing of the coating liquid for forming the hard coat layer and pitting of the coating, which would cause the cracking or the reduction in scratch resistance mentioned above.

As a result of further studies, the inventors have also found that deposition of a surfactant onto the surface of a substrate, where the hard coat layer is to be formed, significantly occurs when a certain production method is used to form a laminated film with the structure mentioned above. Specifically, the inventors have found that when the substrate is subjected to a process that includes forming a surfactant-containing layer on one surface of the substrate, then temporarily winding the substrate, then unwinding the substrate, and forming a hard coat layer on the substrate, the surfactant is more likely to be deposited locally on the surface of the substrate where the hard coat layer is to be formed, so that the uneven wetting mentioned above is more likely to occur.

Subsequently, the inventors have concluded that the addition of a specific amount of a (meth)acrylic modified silicone compound to the hard coat layer would be such that the silicone moiety of the (meth)acrylic modified silicone compound has an affinity for the surfactant deposited on the surface of the substrate where the hard coat layer is to be formed, so that coating defects such as cissing and pitting mentioned above can be suppressed. It will be understood that the technical scope of the present invention will not be influenced by whether or not the mechanism based on the assumption is correct.

Hereinafter, the elements of the laminated film according One or more embodiments and modes and embodiments for carrying out the present invention will be described in detail.

[Substrate]

The substrate has the function of allowing a film to be formed on its surface in a coating and drying process.

The substrate is preferably a transparent material. Any of various resin films may be used as the substrate. The substrate may be, for example, a polyolefin film (such as a polyethylene or polypropylene film), a polyester film (such as a polyethylene terephthalate or polyethylene naphthalate film), a polyvinyl chloride film, a cellulose triacetate film, a polyimide film, a polybutyral film, a cycloolefin polymer film, or a transparent cellulose nanofiber film. Among them, a polyester film is preferably used.

In particular, in view of transparency, mechanical strength, dimensional stability, and other properties, the polyester film preferably includes a polyester including, as main components, a dicarboxylic acid component such as a terephthalic acid or 2,6-naphthalenedicarboxylic acid component and a diol component such as an ethylene glycol or 1,4-cyclohexanedimethanol component and having film forming ability. Particularly preferred are a polyester including polyethylene terephthalate or polyethylene naphthalate as a main component, a copolyester of terephthalic acid, 2,6-naphthalenedicarboxylic acid, and ethylene glycol, and a material composed mainly of a mixture of two or more of these polyesters.

The material for the substrate and the thickness of the substrate are preferably so selected that the value obtained by dividing the thermal shrinkage percentage of the laminated film by the thermal shrinkage percentage of the substrate falls within the range of 1 to 3.

In particular, the thickness of the substrate is preferably from 30 to 200 µm, more preferably from 30 to 150 µm, most preferably from 35 to 125 µm. The substrate with a thickness of 30 µm or more resists wrinkling during handling, which is preferred. On the other hand, when bonded to a transparent base material, the substrate with a thickness of 200 µm or less can well follow, for example, the curved surface of the transparent base material, which makes wrinkling less likely to occur and thus is preferred.

The substrate is preferably a biaxially oriented polyester film. An unstretched polyester film or a polyester film stretched in at least one direction may also be used as the substrate. In order to improve strength or suppress thermal expansion, the substrate is preferably a stretched film. Particularly for use in automobile front laminated glass, the substrate is more preferably a stretched film.

[Surfactant-Containing Layer]

The surfactant-containing layer may be any layer containing a surfactant. Any of various conventionally known functional layers may be used as the surfactant-containing layer. The functional layer for use as the surfactant-containing layer may be any of a coating film formed by applying a water-soluble resin-containing coating liquid (generally containing an aqueous solvent such as waster), a coating film formed by applying an organic solvent-soluble resin-containing coating liquid (generally containing an organic solvent), and a coating film of a solvent-free resin composition.

In this case, the surfactant-containing layer preferably contains a water-soluble resin in order to reduce environmental load or process load. Examples of the water-soluble resin include, but are not limited to, polyvinyl alcohol resins, gelatin, celluloses, thickening polysaccharides, and reactive functional group-containing polymers. As used herein, the term "water-soluble" means that when a polymer is dissolved at a concentration of 0.5% by weight in water at a temperature where the polymer is most soluble and then the solution is filtered through a G2 glass filter (40 to 50 µm in maximum pore size), the weight of the insoluble material separated by the filtration is 50% by weight or less of the polymer added. Examples of the organic solvent-soluble resin include, but are not limited to, acrylic resins, polyurethane resins, polyester resins, melamine resins, polyvinyl acetate, cellulose acetate, polycarbonate, polyacetal polybutyral, polyamide (nylon) resins, polystyrene resins, polyimide resins, ABS resins, polyvinylidene fluoride, and ultraviolet-curable resins. Examples of ultraviolet-curable resins include (meth)acrylate resins, urethane acrylate resins, polyester acrylate resins, epoxy acrylate resins, epoxy resins, and oxetane resins. These resins may also be used in the form of solvent-free resin compositions.

The functional layer for use as the surfactant-containing layer is preferably a coating film formed by applying a water-soluble resin-containing coating liquid (generally containing an aqueous solvent such as water), more preferably a dielectric multilayer coating including a stack of alternating low and high refractive index layers. Hereinafter, a detailed description will be given of the case where the surfactant-containing layer is the dielectric multilayer coating.

(Dielectric Multilayer Coating)

The dielectric multilayer coating includes a stack of alternating low and high refractive index layers. When light with a specific wavelength (e.g., infrared light) is incident on the dielectric multilayer coating including layers of such different refractive indices, the dielectric multilayer coating can reflect at least part of the light to produce a shielding effect (and thus to produce a heat shielding effect in the case of infrared light).

In an embodiment, whether a certain refractive index layer in the dielectric multilayer coating is a low or high refractive index layer can be determined by comparing its refractive index with that of its adjacent refractive index layer. Specifically, when a certain refractive index layer is selected as a reference layer and when the refractive index layer adjacent to the reference layer has a refractive index lower than that of the reference layer, the reference layer is determined as a high refractive index layer (and the adjacent layer is determined as a low refractive index layer). On the other hand, when the adjacent layer has a refractive index higher than that of the reference layer, the reference layer is determined as a low refractive index layer (and the adjacent layer is determined as a high refractive index layer). Therefore, whether a certain refractive index layer is a high or low refractive index layer is determined by the relative relationship between the refractive indices of it and its adjacent layer, and a certain refractive index layer can be either a high or low refractive index layer depending on the relationship with its adjacent layer.

The refractive index layers to be used are preferably, but not limited to, those known in the art. Examples of known refractive index layers include refractive index layers formed by a dry film-forming method, refractive index layers formed by extrusion of resin, and refractive index layers formed by a wet film-forming method.

As mentioned above, whether a certain refractive index layer is a low or high refractive index layer is determined by the relative relationship between the refractive indices of it and its adjacent layer, and a certain refractive index layer can be either a low or high refractive index layer. Thus, hereinafter, the features of typical high and low refractive index layers will be described among the refractive index layers formed by the respective methods.

Refractive Index Layer Formed by Wet Film-Forming Method

The wet film-forming method may include, for example, sequentially applying and drying coating liquids to form refractive index layers or applying coating liquids to form a stack of layers and drying the stack of layers to form refractive index layers. The refractive index layers of the infrared-shielding film according to an embodiment is preferably formed by this wet film-forming method, more preferably by a method that includes applying coating liquids to form a stack of layers and drying the stack of layers.

High Refractive Index Layer

The high refractive index layer preferably contains a water-soluble resin. In addition, if necessary, the high refractive index layer may contain metal oxide particles, a curing agent, a surfactant, and other additives (in an embodiment, one of the high refractive index layer and the low refractive index layer described below (preferably the layer exposed on the side opposite to the substrate) necessarily contains the surfactant). In this regard, for the sake of convenience, the water-soluble resin and the metal oxide particles in the high refractive index layer are called "the first water-soluble resin" and "the first metal oxide particles," respectively.

(1) First Water-Soluble Resin

Examples of the first water-soluble resin that may be used include, but are not limited to, polyvinyl alcohol resins, gelatin, celluloses, thickening polysaccharides, and reactive group-containing polymers. Among them, polyvinyl alcohol resins are preferably used.

Polyvinyl Alcohol Resins

Examples of the polyvinyl alcohol resins include common polyvinyl alcohol obtained by hydrolysis of polyvinyl acetate (unmodified polyvinyl alcohol) and modified polyvinyl alcohols such as cation-modified polyvinyl alcohols, anion-modified polyvinyl alcohols, nonion-modified polyvinyl alcohols, and vinyl alcohol-based polymers. Some modified polyvinyl alcohols can improve the adhesion, water resistance, and flexibility of the coating.

Gelatin

Various conventional gelatins widely used in the field of silver halide photosensitive materials may be used. Examples include acid-treated gelatin, alkali-treated gelatin, enzyme-treated gelatin obtained through an enzyme treatment in the gelatin production process, and gelatin derivatives that are modified by a treatment with a reagent capable of reacting a functional group in the molecule, such as amino, imino, hydroxyl, or carboxyl.

When gelatin is used, a film curing agent for gelatin may also be added as needed.

Celluloses

Celluloses that may be used preferably include water-soluble cellulose derivatives. Examples of celluloses include water-soluble cellulose derivatives such as carboxymethyl cellulose (cellulose carboxymethyl ether), methyl cellulose, hydroxymethyl cellulose, hydroxyethyl cellulose, and hydroxypropyl cellulose; carboxylic acid group-containing celluloses such as carboxymethyl cellulose (cellulose carboxymethyl ether) and carboxyethyl cellulose; and cellulose derivatives such as nitrocellulose, cellulose acetate propionate, cellulose acetate, and cellulose sulfate ester.

Thickening Polysaccharides

Thickening polysaccharides are saccharide polymers, which have a large number of hydrogen bonding groups in their molecule. The thickening polysaccharides have such properties that there is a large difference between their viscosity at low temperature and their viscosity at high temperature due to the temperature-dependent difference in intermolecular hydrogen bonding strength. When metal oxide fine particles are added to a thickening polysaccharide, an increase in viscosity can occur at low temperature, which seems to be due to hydrogen bonding between the thickening polysaccharide and the metal oxide fine particles. The degree of the increase in viscosity at 15° C. is generally 1.0 mPa·s or more, preferably 5.0 mPa·s or more, more preferably 10.0 mPa·s or more.

Examples of thickening polysaccharides that may be used include, but are not limited to, natural simple polysaccharides, natural complex polysaccharides, synthetic simple polysaccharides, and synthetic complex polysaccharides. For the details of these polysaccharides, reference may be made to, for example, Seikagakujiten (Biochemical Dictionary), 2nd Edition, published by Tokyo Kagaku Dozin Co., Ltd., and Shokuhinkogyo (Food Industry), Vol. 31 (1988), page 21.

Reactive Functional Group-Containing Polymers

Examples of reactive functional group-containing polymers include polyvinylpyrrolidone materials; acrylic resins such as polyacrylic acid, acrylic acid-acrylonitrile copolymers, potassium acrylate-acrylonitrile copolymers, vinyl acetate-acrylic ester copolymers, and acrylic acid-acrylic ester copolymers; styrene acrylic acid resins such as styrene-acrylic acid copolymers, styrene-methacrylic acid copolymers, styrene-methacrylic acid-acrylic ester copolymers, styrene-α-methylstyrene-acrylic acid copolymers, and styrene-α-methylstyrene-acrylic acid-acrylic ester copolymers; styrene-sodium styrene sulfonate copolymers, styrene-2-hydroxyethyl acrylate copolymers, styrene-2-hydroxyethyl acrylate-potassium styrene sulfonate copolymers, styrene-maleic acid copolymers, styrene-maleic anhydride copolymers, vinylnaphthalene-acrylic acid copolymers, vinylnaphthalene-maleic acid copolymers, vinyl acetate-maleic ester copolymers, vinyl acetate-crotonic acid copolymers, vinyl acetate-acrylic acid copolymers, and other vinyl acetate-based copolymers; and salts thereof. Among these polymers, polyvinylpyrrolidone materials and copolymers containing polyvinylpyrrolidone are preferably used.

These water-soluble resins may be used alone or in mixture of two or more.

The first water-soluble resin preferably has a weight average molecular weight of 1,000 to 200,000, more preferably 3,000 to 40,000. In the description, the "weight average molecular weight" value refers to the value measured by gel permeation chromatography (GPC).

The content of the first water-soluble resin is preferably from 5 to 50% by weight, more preferably from 10 to 40% by weight, based on 100% by weight of the solids in the high refractive index layer.

(2) First Metal Oxide Particles

The first metal oxide particles are preferably, but not limited to, metal oxide particles with a refractive index of 2.0 to 3.0. Examples of the metal oxide include titanium oxide, zirconium oxide, zinc oxide, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide. Among them, the first metal oxide particles preferably include titanium oxide or zirconium oxide in order to form a transparent, relatively high refractive index layer. In order to improve weather resistance, the first metal oxide particles more preferably include rutile-type (tetragonal) titanium oxide.

Titanium oxide may also be used to form core-shell particles, which are coated with a silicon-containing hydrous oxide. The core-shell particles each have a structure in which the surface of a titanium oxide particle core is covered with a shell including a silicon-containing hydrous oxide. In this case, the titanium oxide particles, which each form the core, preferably have a volume average particle size of more 1 nm to less than 30 nm, more preferably 4 nm to less than 30 nm. When such core-shell particles are added, interlayer mixing between the high and low refractive index layers can be suppressed due to the interaction between the water-soluble resin and the silicon-containing hydrous oxide in the shell layer.

The first metal oxide particles may include one of the above metal oxides or a mixture of two or more of the above metal oxides.

For a large difference in refractive index between the high and low refractive index layers, the content of the first metal oxide particles is preferably from 15 to 80% by weight, more preferably from 20 to 77% by weight, even more preferably from 30 to 75% by weight, based on 100% by weight of the solids in the high refractive index layer.

The first metal oxide particles preferably have a volume average particle size of 30 nm or less, more preferably 1 to 30 nm, even more preferably 5 to 15 nm. When the volume average particle size is 30 nm or less, low haze and high visible-light transparency can be achieved, which is preferred. In the description, the "volume average particle size" refers to the value measured by the following method. Specifically, any 1,000 particles present in the cross-section and surface of the refractive index layer are observed and measured for particle size using an electron microscope. The volume average particle size (mv) is calculated using the formula below, provided that the volume per particle is expressed as vi in a population of metal oxide particles where particles with diameters d1, d2, . . . , di, . . . , dk are present in numbers n1, n2, . . . , ni, . . . , nk, respectively.

$$mv = \{\Sigma(vi*di)\}/\{\Sigma(vi)\} \quad \text{[Formula 1]}$$

(3) Curing Agent

The curing agent has the function of reacting with the first water-soluble resin (preferably, a polyvinyl alcohol resin) in the high refractive index layer to form a hydrogen bonding network.

The curing agent may be of any type capable of undergoing a curing reaction with the first water-soluble resin. In general, the curing agent may be a compound having a group capable of reacting with the water-soluble resin or a compound capable of promoting the reaction between different groups of the water-soluble resin.

As a specific example, when polyvinyl alcohol is used as the first water-soluble resin, boric acid and a salt thereof are each preferably used as the curing agent. Alternatively, any known curing agent other than boric acid and a salt thereof may also be used.

In this regard, the term "boric acid and a salt thereof" means an oxyacid with a boron atom as a central atom and a salt thereof. Examples include orthoboric acid, diboric acid, metaboric acid, tetraboric acid, pentaboric acid, octaboric acid, and salts thereof.

The content of the curing agent is preferably from 1 to 10% by weight, more preferably from 2 to 6% by weight, based on 100% by weight of the solids in the high refractive index layer.

Particularly when polyvinyl alcohol is used as the first water-soluble binder resin, the curing agent is preferably used in a total amount of 1 to 600 mg per 1 g of polyvinyl alcohol, more preferably 100 to 600 mg per 1 g of polyvinyl alcohol.

Surfactant

Examples of the surfactant include, but are not limited to, an amphoteric surfactant, a cationic surfactant, an anionic surfactant, a nonionic surfactant, a fluorosurfactant, and a silicon-based surfactant. In particular, an acrylic surfactant, a silicon-based surfactant, or a fluorosurfactant is used. The surfactant is preferably a long chain alkyl group-containing surfactant, more preferably a surfactant having an alkyl group of 6 to 20 carbon atoms.

Examples of the amphoteric surfactant include alkyl betaine, alkylamine oxide, cocamidopropyl betaine, lauramidopropyl betaine, palm kernel fatty acid amidopropyl betaine, cocoamphoacetate Na, lauroamphoacetate Na, lauramidopropyl hydroxysultaine, lauramidopropylamine oxide, myristamidopropylamine oxide, and hydroxyalkyl (C12-14) hydroxyethyl sarcosine.

Examples of the cationic surfactant include alkylamine salts and quaternary ammonium salts.

Examples of the anionic surfactant include alkyl sulfate salts, polyoxyethylene alkyl ether sulfate salts, alkylbenzene sulfonate salts, fatty acid salts, polyoxyethylene alkyl ether phosphate salts, and dipotassium alkenylsuccinate.

Examples of the nonionic surfactant include polyoxyethylene alkyl ethers (e.g., EMULGEN series manufactured by Kao Corporation), polyoxyethylene sorbitan fatty acid esters (e.g., RHEODOL TW series manufactured by Kao Corporation), glycerine fatty acid esters, polyoxyethylene fatty acid esters, polyoxyethylene alkylamines, and alkylalkanolamides.

Examples of the fluorosurfactant include Surflon S-211, S-221, S-231, S-241, S-242, S-243, and S-420 (manufactured by AGC Seimi Chemical Co., Ltd.), MEGAFACE F-114, F-410, F-477, and F-553 (manufactured by DIC Corporation), and FC-430, FC-4430, and FC-4432 (manufactured by 3M Company).

Examples of the silicon-based surfactant include BYK-345, BYK-347, BYK-348, and BYK-349 (manufactured by BYK Japan KK).

The high refractive index layer may also contain an additional additive. Examples of the additional additive include an amino acid, an emulsion resin, and a lithium compound. Examples of the additional additive that may be used also include an ultraviolet absorber such as that described in JP 57-74193 A, JP 57-87988 A, or JP 62-261476 A, a discoloration inhibitor such as that described in JP 57-74192 A, JP 57-87989 A, JP 60-72785 A, JP 61-146591 A, JP 01-95091 A, or JP 03-13376 A, a fluorescent brightening agent such as that described in JP 59-42993 A, JP 59-52689 A, JP 62-280069 A, JP 61-242871 A, or JP 04-219266 A, a pH adjusting agent such as sulfuric acid, phosphoric acid, acetic acid, citric acid, sodium hydroxide, potassium hydroxide, or potassium carbonate, an anti-foaming agent, a lubricant such as diethylene glycol, a preservative, a fungicide, an antistatic agent, a matting agent, a thermal stabilizer, an antioxidant, a flame retardant, a crystal nucleating agent, inorganic particles, organic particles, a thinner, a lubricant, an infrared absorber, a dye, a pigment, and various other known additives.

Low Refractive Index Layer

The low refractive index layer also preferably contains a water-soluble resin. In addition, if necessary, the low refractive index layer may contain metal oxide particles, a curing agent, a surfactant, and other additives (as mentioned above, one of the high refractive index layer or the low refractive index layer described below (preferably the layer exposed on the side opposite to the substrate) necessarily contains the surfactant). In this regard, for the sake of convenience, the water-soluble resin and the metal oxide particles in the low refractive index layer are called "the second water-soluble resin" and "the second metal oxide particles," respectively.

(1) Second Water-Soluble Resin

The second water-soluble resin may be the same as or similar to the first water-soluble resin.

In this case, when both the high and low refractive index layers are produced using polyvinyl alcohol resins as the first and second water-soluble resins, the polyvinyl alcohol resins preferably have different saponification degrees. This feature makes it possible to suppress interfacial mixing, to provide higher infrared reflectance (infrared-shielding rate), and to reduce haze. As used herein, the term "saponification degree" means the ratio of the number of hydroxy groups in polyvinyl alcohol to the total number of acetyloxy groups (derived from vinyl acetate as a raw material) and hydroxy groups in polyvinyl alcohol.

(2) Second Metal Oxide Particles

The second metal oxide particles preferably include, but are not limited to, silica (silicon dioxide) such as synthetic amorphous silica or colloidal silica, more preferably acidic colloidal silica. For a further reduction in refractive index, the second metal oxide particles may include hollow fine particles having pores inside and in particular preferably include hollow silica (silicon dioxide) fine particles.

The colloidal silica may have undergone cationic surface modification or treatment with Al, Ca, Mg, or Ba.

The second metal oxide particles may also be surface-coated with a surface coating material.

In one or more embodiments, the second metal oxide particles (preferably silicon dioxide) in the low refractive index layer preferably have an average particle size (number average diameter) of 3 to 100 nm, more preferably 3 to 50 nm. As used herein, the "average particle size (number average diameter)" of the metal oxide fine particles refers to the value determined by observing, with an electron microscope, particles themselves or particles appearing in the cross-section and the surface of the refractive index layer, measuring the sizes of any 1,000 particles, and calculating the simple average (number average) of the measured particle sizes. In this case, the size of each particle is represented by the diameter of a circle assumed to have an area equal to the projected area of the particle.

The content of the second metal oxide particles in the low refractive index layer is preferably from 0.1 to 70% by weight, more preferably from 30 to 70% by weight, even more preferably from 45 to 65% by weight, based on 100% by weight of the total solids in the low refractive index layer.

For refractive index control and other purposes, the second metal oxide may be one or a combination of two or more of the above metal oxides.

Curing Agent, Surfactant, and Other Additives

The low refractive index layer may also contain a curing agent, a surfactant, and other additives, which may be the same as or similar to those for the high refractive index layer, and, therefore, the description thereof is omitted herein.

In the dielectric multilayer coating including a stack of alternating high and low refractive index layers having the features described above, at least one of the high and low refractive index layers is preferably a refractive index layer formed by a wet film-forming method, and more preferably, both of the high and low refractive index layers are refractive index layers formed by a wet film-forming method. In addition, at least one of the high and low refractive index layers preferably contains metal oxide particles, and more preferably, both of the high and low refractive index layers contain metal oxide particles.

The laminated film according to embodiments of the present invention may be an infrared-shielding film capable of reflecting infrared light. In this case, the laminated film according to embodiments of the present invention is preferably designed to have a large difference in refractive index between the low and high refractive index layers, so that it can have a higher infrared reflectance with a smaller number of layers. In an embodiment, at least one stack of low and high refractive index layers preferably has a refractive index difference of 0.1 or more, more preferably 0.3 or more, even more preferably 0.35 or more, further more preferably 0.4 or more, between the adjacent low and high refractive index layers. When the multilayer coating has a plurality of stacks of high and low refractive index layers, the refractive index difference between the high and low refractive index layers in all the stacks preferably falls within the above preferred range. Even in such a case, however, the refractive index layer constituting the uppermost or lowermost layer of the dielectric multilayer coating may make a refractive index difference out of the preferred range.

Concerning the optical properties of the laminated film of an embodiment, the laminated film preferably has a transmittance of 50% or more, more preferably 75% or more, even more preferably 85% or more, in the visible light region, as measured according to JIS R 3106-1998, and also preferably has a reflectance of more than 50% in a region within the wavelength range of 900 nm to 1,400 nm.

From these points of view, the number of the refractive index layers in the dielectric multilayer coating (the total number of the high and low refractive index layers) is preferably from 6 to 50, more preferably from 8 to 40, even more preferably from 9 to 30, further more preferably from 11 to 31. When the number of the refractive index layers in the dielectric multilayer coating falls within the ranges, high heat-shielding performance and high transparency can be achieved and the coating can be prevented from peeling or cracking, which is preferred. The dielectric multilayer coating may have a plurality of high refractive index layers and/or a plurality of low refractive index layers. In this case, the respective high refractive index layers may be the same or different, and/or the respective low refractive index layers may be the same or different.

The high refractive index layers each preferably have a thickness of 20 to 800 nm, more preferably 50 to 500 nm. The low refractive index layers each preferably have a thickness of 20 to 800 nm, more preferably 50 to 500 nm.

In some cases, there is no clear interface between the high and low refractive index layers and there is a continuous compositional change between them when the thickness per layer is measured. In such an interface region with a continuous compositional change, the point at which the refractive index is equal to the minimum refractive index+ $\Delta n/2$, wherein $\Delta n$ is equal to the maximum refractive index− the minimum refractive index, should be regarded as the interface between the two layers.

When the high and low refractive index layers contain metal oxide particles, the composition can be observed by observing the profile of the concentration of the metal oxide particles. The profile of the concentration of the metal oxide can be observed by measuring the atomic composition ratio while etching the layer in the depth direction from the surface by sputtering at a rate of 0.5 nm/minute using an XPS surface analyzer, in which the uppermost surface is designated as 0 nm. Alternatively, the laminated film may be cut, and the cut surface may be subjected to measurement of the atomic composition ratio using an XPS surface analyzer when the profile is observed.

The XPS surface analyzer may be of any type. The XPS surface analyzer may be, for example, ESCALAB-200R manufactured by VG Scientific. The measurement is performed at a power of 600 W (accelerating voltage 15 kV, emission current 40 mA) using Mg for the X-ray anode.

Although the features of the surfactant-containing layer have been specifically described with reference to examples where the surfactant-containing layer is a dielectric multilayer coating, embodiments of the present invention is also applicable when the surfactant-containing layer is any of various functional layers other than dielectric multilayer coatings. The functional layer for use as the surfactant-containing layer other than the dielectric multilayer coating may be, for example, an antistatic layer, an adhesion-imparting intermediate layer, or a colorant layer. Conventional knowledge may be referred to, as appropriate, for the specific features of these layers.

[Hard Coat Layer]

In one or more embodiments, the "hard coat layer" should be a layer having a pencil hardness of H or harder, preferably 2H or harder, according to JIS K 5600-5-4.

In view of scratch resistance, the hardness of the hard coat layer is preferably in such a range that the layer does not break or peel off when external stress such as bending is applied to the layer.

If the hard coat layer is too thick, it can be at risk of cracking under stress, and if the hard coat layer is too thin, it can fail to maintain a certain level of hardness. Therefore, the hard coat layer preferably has a thickness of 1 to 5 μm, more preferably 1.5 to 3 μm.

The material used to form the hard coat layer is not limited, and conventional knowledge may be referred to for the material. Examples of materials that may be used to form the hard coat layer include inorganic materials typified by polysiloxane hard coats, active energy ray-curable resins, and other materials.

(Polysiloxane Hard Coat)

A polysiloxane hard coat is made from a starting material represented by the formula $R_m Si(OR')_n$, wherein R and R' each represent an alkyl group of 1 to 10 carbon atoms, and m and n are integers satisfying the relation m+n=4. Specific examples of the starting material include tetramethoxysilane, tetraethoxysilane, tetraisopropoxysilane, tetra-n-propoxysilane, tetra-n-butoxysilane, tetra-sec-butoxysilane, tetra-tert-butoxysilane, tetrapentaethoxysilane, tetrapentaisopropoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, dimethyldimethoxysilane, dimethyldiethoxysilane, and hexyltrimethoxysilane. Specific examples that may also be used include γ-(2-aminoethyl)aminopropyltrimethoxysilane, γ-(2-aminoethyl)aminopropylmethyldimethoxysilane, β-(3,4-epoxycyclohexyl)ethyltrimethoxysilane, N-β-(N-aminobenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyltris(β-methoxyethoxy)silane, and octadecyldimethyl[3-(trimethoxysilyl)propyl]ammonium chloride. A product produced through replacement of these hydrolyzable groups such as methoxy and ethoxy groups with hydroxyl groups is generally called a polyorganosiloxane hard coat. When this material is applied to a substrate and then cured by heating, dehydration condensation reaction proceeds to cause curing and crosslinking, so that a hard coat layer is formed. Among these polyorganosiloxane hard coats, those having methyl groups as organic groups not removable by hydrolysis have the highest weather resistance. In addition, methyl groups can be uniformly and densely distributed over the surface of the hard coat layer after the film formation, so that the falling angle will be small. Therefore, methylpolysiloxane is preferably used for the present purpose.

Specific examples of the polyorganosiloxane hard coat that may be used include SARCoat series (manufactured by DOKEN Co. Ltd.), SR2441 (Dow Corning Toray Co., Ltd.), and Perma-New™ 6000 (California Hardcoating Company).

(Active Energy Ray-Curable Resin)

A resin material such as an active energy ray-curable resin is also preferably used as the material to form the hard coat layer. The active energy ray-curable resin refers to a resin capable of being cured through a crosslinking reaction or other reactions when irradiated with active rays such as ultraviolet rays or electron beams. A material including a monomer having an ethylenically unsaturated double bond is preferably used to form the active energy ray-curable resin. The active energy ray-curable resin is cured by irradiation with active rays such as ultraviolet rays or electron beams to form an active energy ray-cured resin layer. Typical examples of the active energy ray-curable resin include ultraviolet-curable resins and electron beam-curable resins. In particular, resins curable by ultraviolet irradiation are preferred.

Examples of ultraviolet-curable resins that are preferably used include ultraviolet-curable urethane acrylate resins, ultraviolet-curable polyester acrylate resins, ultraviolet-curable epoxy acrylate resins, ultraviolet-curable polyol acrylate resins, or ultraviolet-curable epoxy resins. In particular, the acrylate resins shown below are preferred. These resins may be used alone or in combination of two or more.

As used herein, the term "(meth)acrylate" means acrylate or methacrylate. In one or more embodiments, the (meth) acrylate may be any of a monomer, an oligomer, and a prepolymer without limitation. The (meth)acrylate may be a monofunctional (meth)acrylate or a difunctional or polyfunctional (meth)acrylate. The (meth)acrylate may also have a polar group-containing molecular structure or a low-polarity molecular structure.

The (meth)acrylate monomer for use as an ultraviolet-curable resin may also be in the form of a (meth)acrylate oligomer. Examples of such a (meth)acrylate oligomer include polyester (meth)acrylate oligomers, epoxy (meth) acrylate oligomers, urethane (meth)acrylate oligomers, polyether (meth)acrylate oligomers, polybutadiene (meth) acrylate oligomers, and silicone (meth)acrylate oligomers (also called "urethane acrylate").

In one or more embodiments, when the hard coat layer contains a resin component, the content of urethane acrylate is preferably in the range of 10 to 90% by weight, more preferably in the range of 15 to 60% by weight, based on 100% by weight of the resin component. The hard coat layer with a urethane acrylate content of 10% by weight or more can have improved wear resistance while maintaining flexibility. The hard coat layer with a urethane acrylate content of 90% by weight or less can have improved flexibility while maintaining a certain level of wear resistance and coating hardness.

In a particularly preferred embodiment, when the hard coat layer contains a resin component, the content of a hydroxyl group-containing urethane acrylate should be 50% by weight or more based on 100% by weight of the resin component. The content thereof is more preferably from 50 to 90% by weight, even more preferably from 60 to 85% by weight. Such features make it possible to achieve the advantage that the adhesion between the substrate and the hard coat layer is improved.

(Photopolymerization Initiator)

The material used to form the hard coat layer may contain a conventionally known photopolymerization initiator when a resin component such as the active energy ray-curable resin is used to form the hard coat layer. When a photopolymerization initiator is added, the active energy ray (ultraviolet ray) irradiation-assisted polymerization curing reaction for the hard coat layer can be performed in a short period of time.

The content of the polymerization initiator in the solids of the hard coat layer is preferably from 0.01 to 10% by weight, more preferably from 0.1 to 7% by weight, even more preferably 0.1 to 5% by weight, based on the weight of the total solids in the hard coat layer. When a photopolymerization initiator is used, any of various known dyes or sensitizers may also be added to improve the photocurability. In addition, a thermal polymerization initiator capable of curing the hard coat layer by heating may also be used in combination with the photopolymerization initiator. In this case, heating may be performed after the photocuring, so that it can be expected that the polymerization curing of the hard coat layer will be further accelerated.

((Meth)Acrylic Modified Silicone Compound)

One of the features of embodiments of the present invention is that the hard coat layer contains a (meth)acrylic modified silicone compound. As used herein, the term "(meth)acrylic modified silicon compound" refers to a compound having a (meth)acrylic group that is introduced into any position of a silicone skeleton, such as the side chain or end of a silicone skeleton (preferably the end (one end or both ends), more preferably both ends). This compound itself may be any appropriate conventionally known compound. Specific examples of the (meth)acrylic modified silicone compound include TEGO Rad 2010 and TEGO Rad 2011 (manufactured by Evonik Industries AG), SQ 100 and SQ 200 (manufactured by TOKUSHIKI Co., Ltd.), CN990 and CN9800 (manufactured by Sartomer), EBECRYL 350 (manufactured by DAICEL-ALLNEX LTD.), X-22-2445 and X-22-1602 (dual end acrylate modified silicon), X-22-164, X-22-164AS, X-22-164A, X-22-164B, X-22-164C, and X-22-164E (dual end methacrylate modified silicon), X-22-174ASX, X-22-174BX, KF-2012, X-22-2426, and X-22-2475 (single end methacrylate modified silicon) (each manufactured by Shin-Etsu Chemical Co., Ltd.); and BYK UV-3500 and BYK UV-3570 (manufactured by BYK Japan KK). Examples of the (meth)acrylic modified silicone compound that may be used also include (meth)acryloxypropyl-terminated polydimethylsiloxane, [(meth)acryloxypropyl] methylsiloxane, and copolymers of [(meth)acryloxypropyl] methylsiloxane and dimethylsiloxane. Compounds obtained by introducing a methyl group into the (meth)acrylic group end of these compounds may also be used. The number of functional groups per molecule is preferably 2 or more although one functional group per molecule is acceptable. The functional group equivalent of the (meth)acrylic modified silicone compound is preferably in the range of 100 to 1,000. Within this range, the resulting hard coat layer can have good tackiness, and the cured product can have good heat resistance.

In one or more embodiments, the content of the (meth) acrylic modified silicone compound in the hard coat layer needs to be from 0.001 to 3% by weight. If the content of the (meth)acrylic modified silicone compound is less than 0.001% by weight, the addition of the (meth)acrylic modified silicone compound cannot sufficiently suppress cracking or reduction in scratch resistance, which is caused by coating defects such as cissing and pitting. On the other hand, if the content of the (meth)acrylic modified silicone compound exceeds 3% by weight, the hard coat layer can also be vulnerable to cracking, so that the cracking can occur. The content of the (meth)acrylic modified silicone compound in the hard coat layer is preferably from 0.01 to 1% by weight, more preferably from 0.03 to 0.5% by weight.

(Inorganic Nanoparticles)

The hard coat layer preferably contains inorganic nanoparticles. When containing inorganic nanoparticles, the hard coat layer can have improved adhesion to the substrate and can improve the scratch resistance of the laminated film. In one or more embodiments, the term "inorganic nanoparticles" means particles that have an average particle size of 200 nm or less as measured by dynamic light scattering and include an inorganic compound (preferably an inorganic oxide).

The specific composition of inorganic nanoparticles in the hard coat layer is not limited. For example, inorganic nanoparticles including a metal oxide suitable for use in the dielectric multilayer coating, such as $SiO_2$, $Al_2O_3$, $ZrO_2$, $TiO_2$, or $CeO_2$, may be used in the hard coat layer.

More preferred examples of the inorganic nanoparticles for use in the hard coat layer include dyes or pigments capable of absorbing or reflecting infrared rays. This feature makes it possible to impart an infrared-shielding effect to the laminated film or to improve the infrared-shielding effect of the laminated film. This effect is particularly useful when the surfactant-containing layer is a dielectric multilayer coating having an infrared-shielding effect. Examples of materials for such inorganic nanoparticles include zinc oxide, antimony-doped zinc oxide (AZO), indium-doped zinc oxide (IZO), gallium-doped zinc oxide (GZO), aluminum-doped zinc oxide, tin oxide, antimony-doped tin oxide (ATO), indium-doped tin oxide (ITO), lanthanum boride, cesium-doped tungsten oxide (CWO), and nickel complex compounds. Specific trade names of these materials include CELNAX series (manufactured by Nissan Chemical Industries, Ltd.) and Pazet series (manufactured by Hakusui Tech Co., Ltd.) for zinc oxide-based materials; and ATO Dispersion and ITO Dispersion (manufactured by Mitsubishi Materials Electronic Chemicals Co., Ltd.) and KH series (manufactured by Sumitomo Metal Mining Co., Ltd.) for tin oxide-based materials. Organic materials such as immonium compounds, phthalocyanine compounds, and aminium compounds may also be used. Specific trade names of these compounds include NIR-IM1 and NIR-AM1 (manufactured by Nagase ChemteX Corporation) and Lumogen series (manufactured by BASF). Other inorganic nanoparticles including Cd/Se, GaN, $Y_2O_3$, Au, Ag, Cu, or other materials may also be used. In particular, the hard coat layer preferably contains inorganic nanoparticles including one or more selected from the group consisting of ATO, ITO, cesium-doped tungsten oxide, gallium zinc oxide, aluminum zinc oxide, and zinc antimonate.

The content of the inorganic nanoparticles in the hard coat layer is preferably, but not limited to, 10 to 80% by weight, more preferably 20 to 65% by weight, in order to control values of physical properties such as surface hardness and coating elastic modulus and optical properties such as transmittance to desired levels.

The method of forming the hard coat layer is not limited. The hard coat layer may be formed by a coating technique such as wire bar coating, spin coating, or dip coating. The hard coat layer may also be formed by a dry film-forming method such as vapor deposition. A continuous coater such as a die coater, a gravure coater, or a comma coater may also be used for the application and the coating formation. In the case of the polysiloxane hard coat, a heat treatment at a temperature of 50° C. to 150° C. for 30 minutes to several days is necessary to accelerate the curing and crosslinking of the hard coat after the application and the subsequent solvent removal by drying. On the other hand, in the case of the active energy ray-curable resin, optimum conditions should be selected depending on the type of the resin used, because the reactivity of the resin varies with the wavelength, illuminance, and amount of the applied active energy rays.

In particular, the hard coat layer is preferably formed by applying an organic solvent-containing coating liquid and then drying the coating. The use of an organic solvent-containing coating liquid can further reduce coating defects such as cissing and pitting in the process of coating on the substrate. As a result, it is possible to further enhance the advantageous effect of embodiments of the present invention, that is, the prevention of scratch resistance reduction or cracking caused by these coating defects.

[Additional Layer]
(Intermediate Layer)

The laminated film according to embodiments of the present invention may also have any layer (additional layer) other than the layers described above. For example, an intermediate layer may be provided as the additional layer. As used herein, the term "intermediate layer" means a layer between the substrate and the surfactant-containing layer or a layer between the substrate and the hard coat layer. Even when an intermediate layer is provided between the substrate and the hard coat layer, embodiments of the present invention can prevent the cracking caused when the surfactant is deposited, due to various factors, on the surface of the intermediate layer on which the hard coat layer is to be formed. Examples of the material used to form the intermediate layer include polyester resins, polyvinyl alcohol resins, polyvinyl acetate resins, polyvinyl acetal resins, acrylic resins, and urethane resins. The intermediate layer is preferably made of a material having low compatibility with the additives and low Tg. Any material satisfying such properties may be used to form the intermediate layer.

(Adhesive Layer)

The laminated film according to embodiments of the present invention may also have an adhesive layer. The adhesive layer is generally provided on the surface of the surfactant-containing layer as a functional layer opposite to its substrate side. A known release paper may be further provided on the adhesive layer. The composition of the adhesive layer is not limited, and any of a dry laminate material, a wet laminate material, an adhesive, a heat seal material, and a hot melt material may be used to form the adhesive layer. The adhesive may include, for example, a polyester resin, a urethane resin, a polyvinyl acetate resin, an acrylic resin, or a nitrile rubber.

[Method of Producing Laminated Film]

The method of producing the laminated film is not limited, and conventional knowledge may be referred to for the method. In this regard, the method of forming the dielectric multilayer coating as the surfactant-containing layer (functional layer) and the method of forming the hard coat layer have been already described, and therefore a detailed description thereof will be omitted here.

In general, the laminated film can be produced by a process that includes forming the surfactant-containing layer on one surface of the substrate and then forming the hard coat layer on the other surface of the substrate. If the laminated film is produced in such a manner, for example, the surfactant being used to form the surfactant-containing layer (and additionally the hard coat layer) can be deposited on the surface of the substrate, where the hard coat layer is to be formed, due to process contamination or other causes, so that coating defects can occur, such as local cissing of the hard coat layer-forming coating liquid and pitting of the coating film. Such coating defects can cause the laminated film to crack or to have reduced scratch resistance.

From these points of view, the method of producing the laminated film according to embodiments of the present invention preferably includes forming the surfactant-containing layer on one surface of the substrate and then forming the hard coat layer on the other surface of the substrate. As a result of further studies, the inventors have also found that the deposition of the surfactant on the surface of the substrate, where the hard coat layer is to be formed, significantly occurs when the laminated film according to embodiments of the present invention is produced by a specific method. Specifically, the inventors have found that when forming the surfactant-containing layer on one surface of the substrate is followed by temporarily winding the substrate into a roll, then unwinding the roll, and forming the hard coat layer on the substrate, the surfactant is more likely to be deposited locally on the surface of the substrate where the hard coat layer is to be formed.

Therefore, another aspect of embodiments of the present invention provides a method of producing a laminated film, including the steps of: forming a surfactant-containing layer on one surface of a substrate to obtain a first laminate;

winding the first laminate into a roll; unwinding the roll of the first laminate; applying a coating liquid to the surface of the substrate opposite to its surface on which the surfactant-containing layer is formed in the first laminate, wherein the coating liquid contains 0.001 to 3% by weight of a (meth) acrylic modified silicone compound based on 100% by weight of the solids in the coating liquid; and drying the coating to form a hard coat layer, so that a laminate film is obtained.

When this production method is carried out, reference may be made, as appropriate, to the above description of the features of the laminated film. The technique for winding, into a roll, a laminate including a plurality of layers, then unwinding the roll of the laminate, and forming an additional layer on the desired surface of the laminate is well known in the art.

EXAMPLES

Hereinafter, embodiments of the present invention will be more specifically described with reference to examples, which, however, are not intended to limit the present invention. In the examples, the term "parts" or "%" used sometimes means "parts by weight" or "% by weight" unless otherwise specified.

Preparation of Laminated Film

Example 1

Preparation of Coating Liquid (Solvent-Based) for Forming Surfactant-Containing Layer Coating liquid 1-A was prepared having the following composition:
ACRIT 8UA-239 (urethane-modified acrylic polymer, manufactured by Taisei Fine Chemical Co., Ltd.) 9.5 parts by weight
MEGAFACE F-477 (fluorosurfactant, manufactured by DIC Corporation) 0.5 parts by weight
Methyl ethyl ketone 990 parts by weight
Preparation of Coating Liquid (Solvent-Free) for Forming Hard Coat Layer
Coating liquid 2-A was prepared having the following composition:
ARONIX M-305 (manufactured by TOAGOSEI CO., LTD.) 600 parts by weight
ARONIX M-220 (manufactured by TOAGOSEI CO., LTD.) 600 parts by weight
BEAMSET 577 (manufactured by ARAKAWA CHEMICAL INDUSTRIES, LTD.) 1,229 parts by weight
UF-8001G (manufactured by Kyoeisha Chemical Co., Ltd.) 150 parts by weight
SHIKOH UV-7600B (manufactured by The Nippon Synthetic Chemical Industry Co., Ltd.) 300 parts by weight
EBECRYL 350 (both ends acrylic modified silicone compound, manufactured by DAICEL-ALLNEX LTD.) 0.03 parts by weight
IRGACURE 184 (manufactured by BASF Japan Ltd.) 60 parts by weight
IRGACURE 819 (manufactured by BASF Japan Ltd.) 60 parts by weight
MEGAFACE F-552 (manufactured by DIC Corporation) 0.9 parts by weight
Preparation of Laminated Film 1
Coating liquid 1-A prepared as described above was applied by blade coating to the surface of one adhesion-promoting layer of a 125-μm-thick polyethylene terephthalate (PET) film (having adhesion-promoting layers on both sides) made of a polyester resin, and then dried at 100° C. for 2 minutes to form a layer with a dry deposition amount of 0.2 g/m². The resulting laminate was then temporarily wound into a roll with the dry coating layer placed inside.

Subsequently, the laminate roll was unwound, and coating liquid 2-A prepared as described above was applied to the exposed surface of the PET film by blade coating to form a coating film. A hard coat layer with a dry thickness of 2.2 μm was formed by curing the coating film by irradiation for 1 second with a 160 W/cm power ultraviolet lamp 5 cm distant from the coating film, so that laminated film 1 was obtained.

Example 2

Preparation of Coating Liquid (Solvent-Free) for Forming Hard Coat Layer
Coating liquid 2-γ was prepared in the same manner as for coating liquid 2-A, except that the amount of EBECRYL 350 used was changed to 0.3 parts by weight.
Preparation of Laminated Film 2
Laminated film 2 was prepared as in Example 1, except that coating liquid 2-γ was used instead of coating liquid 2-A.

Example 3

Preparation of Coating Liquid (Solvent-Free) for Forming Hard Coat Layer

Coating liquid 2-C was prepared in the same manner as for coating liquid 2-A, except that the amount of BEAMSET 577 used was changed to 1,226 parts by weight and the amount of EBECRYL 350 used was changed to 3 parts by weight.
Preparation of Laminated Film 3
Laminated film 3 was prepared as in Example 1, except that coating liquid 2-C was used instead of coating liquid 2-A.

Example 4

Preparation of Coating Liquid (Solvent-Free) for Forming Hard Coat Layer

Coating liquid 2-D was prepared in the same manner as for coating liquid 2-A, except that the amount of BEAMSET 577 used was changed to 1,200 parts by weight and the amount of EBECRYL 350 used was changed to 30 parts by weight.
Preparation of Laminated Film 4
Laminated film 4 was prepared as in Example 1, except that coating liquid 2-D was used instead of coating liquid 2-A.

Example 5

Preparation of Coating Liquid (Solvent-Free) for Forming Hard Coat Layer

Coating liquid 2-γ was prepared in the same manner as for coating liquid 2-A, except that the amount of BEAMSET 577 used was changed to 1,140 parts by weight and the amount of EBECRYL 350 used was changed to 90 parts by weight.

Preparation of Laminated Film 5

Laminated film 5 was prepared as in Example 1, except that coating liquid 2-E was used instead of coating liquid 2-A.

Example 6

Preparation of Coating Liquid (Water-Based) for Forming Surfactant-Containing Layer Coating liquid 1-B was prepared having the following composition:
S-LEC KW-1 (manufactured by SEKISUI CHEMICAL CO., LTD.) 5 parts by weight
Water 94.8 parts by weight
MEGAFACE F-114 (fluorosurfactant, manufactured by DIC Corporation) 0.2 parts by weight Preparation of Laminated Film 6

Laminated film 6 was prepared as in Example 3, except that coating liquid 1-B was used instead of coating liquid 1-A.

Example 7

Preparation of Coating Liquid (Solvent-Based) for Forming Hard Coat Layer

Coating liquid 2-F was prepared having the following composition:
ARONIX M-305 (manufactured by TOAGOSEI CO., LTD.) 72 parts by weight
BEAMSET 577 (manufactured by ARAKAWA CHEMICAL INDUSTRIES, LTD.) 345 parts by weight
UF-8001G (manufactured by Kyoeisha Chemical Co., Ltd.) 85 parts by weight
SHIKOH UV-7600B (manufactured by The Nippon Synthetic Chemical Industry Co., Ltd.) 360 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 18 parts by weight
IRGACURE 819 (manufactured by BASF Japan Ltd.) 18 parts by weight
MEGAFACE F-552 (manufactured by DIC Corporation) 0.27 parts by weight
Methyl isobutyl ketone 2,100 parts by weight Preparation of Laminated Film 7

Laminated film 7 was prepared as in Example 6, except that coating liquid 2-F was used instead of coating liquid 2-C.

Example 8

Preparation of Coating Liquid (Water-Based) for Forming Surfactant-Containing Layer Coating liquid 1-C was prepared having the following composition:
S-LEC KW-1 (manufactured by SEKISUI CHEMICAL CO., LTD.) 5 parts by weight
Water 94.8 parts by weight
BYK-349 (silicon-based surfactant, manufactured by BYK Japan KK) 0.2 parts by weight Preparation of Laminated Film 8

Laminated film 8 was prepared as in Example 7, except that coating liquid 1-C was used instead of coating liquid 1-B.

Example 9

Preparation of Coating Liquid (Water-Based) for Forming Surfactant-Containing Layer Coating liquid 1-D was prepared having the following composition:
S-LEC KW-1 (manufactured by SEKISUI CHEMICAL CO., LTD.) 5 parts by weight
Water 94.8 parts by weight
SOFTAZOLINE LSB-R (5% by weight, lauramidopropyl hydroxysultaine (long chain alkyl group-containing amphoteric surfactant), manufactured by Kawaken Fine Chemicals Co., Ltd.) 0.5 parts by weight Preparation of Laminated Film 9

Laminated film 9 was prepared as in Example 7, except that coating liquid 1-D was used instead of coating liquid 1-B.

Example 10

Preparation of Coating Liquid (Solvent-Based) for Forming Hard Coat Layer

Coating liquid 2-G was prepared having the following composition:
ARONIX M-305 (manufactured by TOAGOSEI CO., LTD.) 72 parts by weight
BEAMSET 577 (manufactured by ARAKAWA CHEMICAL INDUSTRIES, LTD.) 324 parts by weight
UF-8001G (manufactured by Kyoeisha Chemical Co., Ltd.) 63 parts by weight
SHIKOH UV-7600B (manufactured by The Nippon Synthetic Chemical Industry Co., Ltd.) 360 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 17 parts by weight
IRGACURE 819 (manufactured by BASF Japan Ltd.) 17 parts by weight
MEGAFACE F-552 (manufactured by DIC Corporation) 0.27 parts by weight
MEK-ST (colloidal silica-methyl ethyl ketone dispersion, 20 nm in average particle size, manufactured by Nissan Chemical Industries, Ltd.) 150 parts by weight (5% by weight (on a solid basis) calculated in terms of $SiO_2$)
Methyl isobutyl ketone 1,995 parts by weight Preparation of Laminated Film 10

Laminated film 10 was prepared as in Example 9, except that coating liquid 2-G was used instead of coating liquid 2-F.

Example 11

Preparation of Coating Liquid (Solvent-Based) for Forming Hard Coat Layer

Coating liquid 2-H was prepared having the following composition:
ARONIX M-305 (manufactured by TOAGOSEI CO., LTD.) 72 parts by weight BEAMSET 577 (manufactured by ARAKAWA CHEMICAL INDUSTRIES, LTD.) 308 parts by weight UF-8001G (manufactured by Kyoeisha Chemical Co., Ltd.) 36 parts by weight SHIKOH UV-7600B (manufactured by The Nippon Synthetic Chemical Industry Co., Ltd.) 360 parts by weight EBECRYL 350 (both ends acrylic modified silicone compound, manufactured by DAICEL-ALLNEX LTD.) 0.9 parts by weight IRGACURE 184 (manufactured by BASF Japan Ltd.) 16 parts by weight IRGACURE 819 (manufactured by BASF Japan Ltd.) 16 parts by weight MEGAFACE F-552 (manufactured by DIC Corporation) 0.27 parts by weight MEK-ST (colloidal silica-methyl ethyl ketone dispersion, 20 nm in average particle size, manufactured by Nissan Chemical Industries, Ltd.) 300 parts by weight (10% by weight (on a solid basis) calculated in terms of $SiO_2$)

Methyl isobutyl ketone 1,890 parts by weight

Preparation of Laminated Film 11

Laminated film 11 was prepared as in Example 9, except that coating liquid 2-H was used instead of coating liquid 2-F.

Example 12

Preparation of Coating Liquid (Solvent-Based) for Forming Hard Coat Layer

Coating liquid 2-I was prepared having the following composition:

ARONIX M-305 (manufactured by TOAGOSEI CO., LTD.) 72 parts by weight

BEAMSET 577 (manufactured by ARAKAWA CHEMICAL INDUSTRIES, LTD.) 179 parts by weight SHIKOH UV-7600B (manufactured by The Nippon Synthetic Chemical Industry Co., Ltd.) 180 parts by weight EBECRYL 350 (both ends acrylic modified silicone compound, manufactured by DAICEL-ALLNEX LTD.) 0.9 parts by weight IRGACURE 184 (manufactured by BASF Japan Ltd.) 9 parts by weight IRGACURE 819 (manufactured by BASF Japan Ltd.) 9 parts by weight MEGAFACE F-552 (manufactured by DIC Corporation) 0.27 parts by weight MEK-ST (colloidal silica-methyl ethyl ketone dispersion, 20 nm in average particle size, manufactured by Nissan Chemical Industries, Ltd.) 1,500 parts by weight (50% by weight (on a solid basis) calculated in terms of $SiO_2$)

Methyl isobutyl ketone 1,050 parts by weight

Preparation of Laminated Film 12

Laminated film 12 was prepared as in Example 9, except that coating liquid 2-I was used instead of coating liquid 2-F.

Example 13

Preparation of Coating Liquid (Solvent-Based) for Forming Hard Coat Layer

Coating liquid 2-J was prepared having the following composition:

ARONIX M-305 (manufactured by TOAGOSEI CO., LTD.) 72 parts by weight

BEAMSET 577 (manufactured by ARAKAWA CHEMICAL INDUSTRIES, LTD.) 72 parts by weight SHIKOH UV-7600B (manufactured by The Nippon Synthetic Chemical Industry Co., Ltd.) 72 parts by weight EBECRYL 350 (both ends acrylic modified silicone compound, manufactured by DAICEL-ALLNEX LTD.) 0.9 parts by weight IRGACURE 184 (manufactured by BASF Japan Ltd.) 4 parts by weight IRGACURE 819 (manufactured by BASF Japan Ltd.) 4 parts by weight MEGAFACE F-552 (manufactured by DIC Corporation) 0.27 parts by weight MEK-ST (colloidal silica-methyl ethyl ketone dispersion, 20 nm in average particle size, manufactured by Nissan Chemical Industries, Ltd.) 2,400 parts by weight (80% by weight (on a solid basis) calculated in terms of $SiO_2$)

Methyl isobutyl ketone 420 parts by weight

Preparation of Laminated Film 13

Laminated film 13 was prepared as in Example 9, except that coating liquid 2-J was used instead of coating liquid 2-F.

Example 14

Preparation of Coating Liquid (Solvent-Based) for Forming Hard Coat Layer

Coating liquid 2-K was prepared having the following composition:

ARONIX M-305 (manufactured by TOAGOSEI CO., LTD.) 54 parts by weight

BEAMSET 577 (manufactured by ARAKAWA CHEMICAL INDUSTRIES, LTD.) 308 parts by weight UF-8001G (manufactured by Kyoeisha Chemical Co., Ltd.) 90 parts by weight SHIKOH UV-7600B (manufactured by The Nippon Synthetic Chemical Industry Co., Ltd.) 324 parts by weight EBECRYL 350 (both ends acrylic modified silicone compound, manufactured by DAICEL-ALLNEX LTD.) 0.9 parts by weight IRGACURE 184 (manufactured by BASF Japan Ltd.) 16 parts by weight IRGACURE 819 (manufactured by BASF Japan Ltd.) 16 parts by weight MEGAFACE F-552 (manufactured by DIC Corporation) 0.27 parts by weight YMF-02A (cerium-doped tungsten oxide fine particles, 80 nm in average particle size, manufactured by Sumitomo Metal Mining Co., Ltd.) 318 parts by weight (10% by weight (on a solid basis) calculated in terms of $CeWO_3$)

Methyl isobutyl ketone 1,872 parts by weight

Preparation of Laminated Film 14

Laminated film 14 was prepared as in Example 9, except that coating liquid 2-K was used instead of coating liquid 2-F.

Example 15

Dielectric Multilayer Coating

Preparation of Low Refractive Index Layer-Forming Coating Liquid L1

The materials shown below were sequentially mixed at 45° C.

Colloidal silica (SNOWTEX OXS manufactured by Nissan Chemical Industries, Ltd., 10% by weight) 430 parts by weight Aqueous boric acid solution (3% by weight) 150 parts by weight Water 85 parts by weight Polyvinyl alcohol (JP-45 manufactured by JAPAN VAM & POVAL CO., LTD., 4% by weight, degree of polymerization 4,500, degree of saponification 88 mol %) 300 parts by weight SOFTAZOLINE LSB-R (5% by weight, lauramidopropyl hydroxysultaine (long chain alkyl group-containing amphoteric surfactant), manufactured by Kawaken Fine Chemicals Co., Ltd.) 3 parts by weight Finally, the mixture was diluted with pure water to 1,000 parts by weight, resulting in low refractive index layer-forming coating liquid L1.

Preparation of High Refractive Index Layer-Forming Coating Liquid H1

<Preparation of Aqueous Titanium Oxide Sol Dispersion>

With stirring, 30 L (liters) of an aqueous sodium hydroxide solution (concentration 10 mol/L) was added to 10 L of an aqueous suspension ($TiO_2$ concentration 100 g/L) obtained by suspending titanium dioxide hydrate in water. The mixture was heated to 90° C. and aged for 5 hours, which was followed by neutralization with hydrochloric acid, filtration, and washing with water. The titanium dioxide hydrate used in this reaction (treatment) was a product obtained by subjecting an aqueous titanium sulfate solution to thermal hydrolysis according to a known technique.

The base-treated titanium compound was suspended in pure water in such a manner that a $TiO_2$ concentration of 20 g/L was reached. With stirring, 0.4 mol % of citric acid was added to the suspension based on the amount of $TiO_2$ and heated. When a liquid temperature of 95° C. was reached, concentrated hydrochloric acid was so added that a hydrochloric acid concentration of 30 g/L was reached, and the mixture was stirred for 3 hours while the liquid temperature was maintained.

The pH and zeta potential of the resulting aqueous titanium oxide sol dispersion were measured to be 1.4 and +40 mV, respectively. As a result of particle size measurement with Zeta Sizer Nano manufactured by Malvern instruments Ltd., the volume average particle size was 35 nm, and the monodispersity was 16%.

One kg of pure water was added to 1 kg of the aqueous 20.0% by weight titanium oxide sol dispersion containing rutile-type titanium dioxide particles with a volume average particle size of 35 nm.

<Preparation of Aqueous Silicic Acid Solution>

An aqueous silicic acid solution with a $SiO_2$ concentration of 2.0% by weight was prepared.

<Preparation of Silica-Modified Titanium Oxide Particles>

Two kg of pure water was added to 0.5 kg of the resulting aqueous 10.0% by weight titanium oxide sol dispersion and then heated to 90° C. Subsequently, 1.3 kg of the aqueous 2.0% by weight silicic acid solution was gradually added to the mixture. The resulting dispersion was then heat-treated at 175° C. for 18 hours in an autoclave. The product was then concentrated to give an aqueous sol dispersion of 20% by weight silica-modified titanium oxide particles, which were composed of titanium oxide with the rutile-type structure and a $SiO_2$ coating layer.

Preparation of High Refractive Index Layer-Forming Coating Liquid H1

The materials shown below were sequentially mixed at 45° C.

Aqueous sol dispersion of silica-modified titanium oxide particles (20.0% by weight) 320 parts by weight Aqueous citric acid solution (1.92% by weight) 120 parts by weight Polyvinyl alcohol (PVA-103 manufactured by KURARAY CO., LTD., 10% by weight, degree of polymerization 300, degree of saponification 99 mol %) 20 parts by weight Aqueous boric acid solution (3% by weight) 100 parts by weight Polyvinyl alcohol (PVA-124 manufactured by KURARAY CO., LTD., 4% by weight, degree of polymerization 2,400, degree of saponification 88 mol %) 350 parts by weight SOFTAZOLINE LSB-R (5% by weight, lauramidopropyl hydroxysultaine (long chain alkyl group-containing amphoteric surfactant), manufactured by Kawaken Fine Chemicals Co., Ltd.) 1 part by weight Finally, the mixture was diluted with pure water to 1,000 parts by weight, resulting in high refractive index layer-forming coating liquid H1.

Preparation of Laminated Film 15

Laminated film 15 was prepared as in Example 14, except that a dielectric multilayer coating (represented by "1-E" in Table 1 below) was formed, by the method described below, using low refractive index layer-forming coating liquid L1 and high refractive index layer-forming coating liquid H1 shown above, instead of the layer formed using coating liquid 1-D, and that the thickness of the substrate was changed to 50 µm.

(Method of Forming Dielectric Multilayer Coating)

A slide hopper coater capable of performing nine-layer coating (multilayer coating) was used. While being kept at 45° C., low refractive index layer-forming coating liquid L1 and high refractive index layer-forming coating liquid H1 prepared as described above were applied to a 50-µm-thick polyethylene terephthalate (PET) film (A4300 manufactured by Toyobo Co., Ltd., with adhesion-promoting layers on both sides, 200 m long×210 mm wide) being heated at 45° C. Coating liquids L1 and H1 were applied by simultaneous multilayer coating in such a manner that high and low refractive index layers (9 layers in total) were alternately stacked with the lowermost and uppermost layers being the low refractive index layers and that each low refractive index layer and each high refractive index layer could have a dry thickness of 150 nm and a dry thickness of 130 nm, respectively. The identification of the mixed region (mixed layer) between the layers and the measurement (checking) of the layer thickness were performed by cutting the resulting multilayer coating (infrared-blocking film sample) and then measuring the contents of the high refractive index material ($TiO_2$) and the low refractive index material ($SiO_2$) in the cut section with an XPS surface analyzer. As a result, it was confirmed that each layer thickness mentioned above was ensured.

Immediately after the application, the coating was set by blowing 5° C. cold air on the coating. In this case, the time (setting time) taken for the surface to become completely non-sticky to fingers was 5 minutes.

After the setting was completed, the coating was dried by blowing 80° C. hot air to give a dielectric multilayer coating composed of 9 layers.

Example 16

Preparation of Coating Liquid (Solvent-Based) for Forming Hard Coat Layer

Coating liquid 2-L was prepared having the following composition:

ARONIX M-305 (manufactured by TOAGOSEI CO., LTD.) 54 parts by weight

BEAMSET 577 (manufactured by ARAKAWA CHEMICAL INDUSTRIES, LTD.) 222 parts by weight
UF-8001G (manufactured by Kyoeisha Chemical Co., Ltd.) 90 parts by weight
SHIKOH UV-7600B (manufactured by The Nippon Synthetic Chemical Industry Co., Ltd.) 324 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 14 parts by weight
IRGACURE 819 (manufactured by BASF Japan Ltd.) 14 parts by weight
MEGAFACE F-552 (manufactured by DIC Corporation) 0.27 parts by weight
Heat Ray Cutting Paint PI (manufactured by Mitsubishi Materials Corporation, 90 nm in average particle size) 900 parts by weight (20% by weight (on a solid basis) calculated in terms of ITO)
Methyl isobutyl ketone 1,380 parts by weight
Preparation of Laminated Film 16
Laminated film 16 was prepared as in Example 15, except that coating liquid 2-L was used instead of coating liquid 2-K.

Example 17

Preparation of Coating Liquid (Solvent-Based) for Forming Hard Coat Layer

Coating liquid 2-M was prepared having the following composition:
ARONIX M-305 (manufactured by TOAGOSEI CO., LTD.) 54 parts by weight
BEAMSET 577 (manufactured by ARAKAWA CHEMICAL INDUSTRIES, LTD.) 179 parts by weight
UF-8001G (manufactured by Kyoeisha Chemical Co., Ltd.) 36 parts by weight
SHIKOH UV-7600B (manufactured by The Nippon Synthetic Chemical Industry Co., Ltd.) 162 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 9 parts by weight
IRGACURE 819 (manufactured by BASF Japan Ltd.) 9 parts by weight
MEGAFACE F-552 (manufactured by DIC Corporation) 0.27 parts by weight
Pazet GK (a methyl ethyl ketone dispersion of gallium-doped zinc oxide nanoparticles, 110 nm in average particle size, manufactured by Hakusui Tech Co., Ltd.) 2,250 parts by weight (50% by weight (on a solid basis) calculated in terms of gallium-doped zinc oxide nanoparticles)
Methyl isobutyl ketone 300 parts by weight
Preparation of Laminated Film 17
Laminated film 17 was prepared as in Example 15, except that coating liquid 2-M was used instead of coating liquid 2-K.

Example 18

Preparation of Coating Liquid (Solvent-Based) for Forming Hard Coat Layer

Coating liquid 2-N was prepared having the following composition:
ARONIX M-305 (manufactured by TOAGOSEI CO., LTD.) 54 parts by weight
BEAMSET 577 (manufactured by ARAKAWA CHEMICAL INDUSTRIES, LTD.) 179 parts by weight
UF-8001G (manufactured by Kyoeisha Chemical Co., Ltd.) 36 parts by weight
SHIKOH UV-7600B (manufactured by The Nippon Synthetic Chemical Industry Co., Ltd.) 162 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 9 parts by weight
IRGACURE 819 (manufactured by BASF Japan Ltd.) 9 parts by weight
MEGAFACE F-552 (manufactured by DIC Corporation) 0.27 parts by weight
Pazet CK (a methyl ethyl ketone dispersion of aluminum-doped zinc oxide nanoparticles, 100 nm in average particle size, manufactured by Hakusui Tech Co., Ltd.) 2,250 parts by weight (50% by weight (on a solid basis) calculated in terms of aluminum-doped zinc oxide nanoparticles)
Methyl isobutyl ketone 300 parts by weight
Preparation of Laminated Film 18
Laminated film 18 was prepared as in Example 15, except that coating liquid 2-N was used instead of coating liquid 2-K.

Example 19

Preparation of Coating Liquid (Solvent-Based) for Forming Hard Coat Layer

Coating liquid 2-O was prepared having the following composition:
ARONIX M-305 (manufactured by TOAGOSEI CO., LTD.) 54 parts by weight
BEAMSET 577 (manufactured by ARAKAWA CHEMICAL INDUSTRIES, LTD.) 179 parts by weight
UF-8001G (manufactured by Kyoeisha Chemical Co., Ltd.) 36 parts by weight
SHIKOH UV-7600B (manufactured by The Nippon Synthetic Chemical Industry Co., Ltd.) 162 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 9 parts by weight
IRGACURE 819 (manufactured by BASF Japan Ltd.) 9 parts by weight
MEGAFACE F-552 (manufactured by DIC Corporation) 0.27 parts by weight
CELNAX CX-Z410K (a methyl ethyl ketone dispersion of zinc antimonate particles, 90 nm in average particle size, manufactured by Nissan Chemical Industries, Ltd.) 1,125 parts by weight (50% by weight (on a solid basis) calculated in terms of zinc antimonate particles)
Methyl isobutyl ketone 1,425 parts by weight
Preparation of Laminated Film 19
Laminated film 19 was prepared as in Example 15, except that coating liquid 2-O was used instead of coating liquid 2-K.

Example 20

Preparation of Coating Liquid (Solvent-Based) for Forming Hard Coat Layer

Coating liquid 2-P was prepared having the following composition:
ARONIX M-305 (manufactured by TOAGOSEI CO., LTD.) 54 parts by weight BEAMSET 577 (manufactured by ARAKAWA CHEMICAL INDUSTRIES, LTD.) 179 parts by weight
UF-8001G (manufactured by Kyoeisha Chemical Co., Ltd.) 36 parts by weight
SHIKOH UV-7600B (manufactured by The Nippon Synthetic Chemical Industry Co., Ltd.) 162 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 9 parts by weight
IRGACURE 819 (manufactured by BASF Japan Ltd.) 9 parts by weight
MEGAFACE F-552 (manufactured by DIC Corporation) 0.27 parts by weight
SR35M (a MIBK dispersion of ATO particles (solid content 35% by weight), 80 nm in average particle size, manufactured by Advanced Nano Products Co., Ltd.) 1,286 parts by weight (50% by weight (on a solid basis) calculated in terms of ATO particles)
Methyl isobutyl ketone 1,264 parts by weight Preparation of Laminated Film 20

Laminated film 20 was prepared as in Example 15, except that coating liquid 2-P was used instead of coating liquid 2-K.

Example 21

Preparation of Coating Liquid (Solvent-Based) for Forming Hard Coat Layer

Coating liquid 2-Q was prepared having the following composition:
ARONIX M-305 (manufactured by TOAGOSEI CO., LTD.) 54 parts by weight
BEAMSET 577 (manufactured by ARAKAWA CHEMICAL INDUSTRIES, LTD.) 260 parts by weight
UF-8001G (manufactured by Kyoeisha Chemical Co., Ltd.) 27 parts by weight
SHIKOH UV-7600B (manufactured by The Nippon Synthetic Chemical Industry Co., Ltd.) 90 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 9 parts by weight
IRGACURE 819 (manufactured by BASF Japan Ltd.) 9 parts by weight
MEGAFACE F-552 (manufactured by DIC Corporation) 0.27 parts by weight
SR35M (a MIBK dispersion of ATO particles (solid content 35% by weight), 80 nm in average particle size, manufactured by Advanced Nano Products Co., Ltd.) 1,286 parts by weight (50% by weight (on a solid basis) calculated in terms of ATO particles)
Methyl isobutyl ketone 1,264 parts by weight
Preparation of Laminated Film 21
Laminated film 21 was prepared as in Example 15, except that coating liquid 2-Q was used instead of coating liquid 2-K.

Example 22

Preparation of Coating Liquid (Solvent-Based) for Forming Hard Coat Layer

Coating liquid 2-R was prepared having the following composition:
ARONIX M-305 (manufactured by TOAGOSEI CO., LTD.) 54 parts by weight
BEAMSET 577 (manufactured by ARAKAWA CHEMICAL INDUSTRIES, LTD.) 377 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 9 parts by weight
IRGACURE 819 (manufactured by BASF Japan Ltd.) 9 parts by weight
MEGAFACE F-552 (manufactured by DIC Corporation) 0.27 parts by weight
SR35M (a MIBK dispersion of ATO particles (solid content 35% by weight), 80 nm in average particle size, manufactured by Advanced Nano Products Co., Ltd.) 1,286 parts by weight (50% by weight (on a solid basis) calculated in terms of ATO particles)
Methyl isobutyl ketone 1,264 parts by weight
Preparation of Laminated Film 22
Laminated film 22 was prepared as in Example 15, except that coating liquid 2-R was used instead of coating liquid 2-K.

Example 23

Preparation of Coating Liquid (Solvent-Based) for Forming Hard Coat Layer

Coating liquid 2-S was prepared having the following composition:
BEAMSET 577 (manufactured by ARAKAWA CHEMICAL INDUSTRIES, LTD.) 430 parts by weight
EBECRYL 350 (both ends acrylic modified silicone compound, manufactured by DAICEL-ALLNEX LTD.) 0.9 parts by weight
IRGACURE 184 (manufactured by BASF Japan Ltd.) 9 parts by weight
IRGACURE 819 (manufactured by BASF Japan Ltd.) 9 parts by weight
MEGAFACE F-552 (manufactured by DIC Corporation) 0.27 parts by weight
SR35M (a MIBK dispersion of ATO particles (solid content 35% by weight), 80 nm in average particle size, manufactured by Advanced Nano Products Co., Ltd.) 1,286 parts by weight (50% by weight (on a solid basis) calculated in terms of ATO particles)
Methyl isobutyl ketone 1,264 parts by weight
Preparation of Laminated Film 23
Laminated film 23 was prepared as in Example 15, except that coating liquid 2-S was used instead of coating liquid 2-K.

Example 24

Preparation of Coating Liquid (Solvent-Based) for Forming Hard Coat Layer

Coating liquid 2-T was prepared having the following composition:
BEAMSET 577 (manufactured by ARAKAWA CHEMICAL INDUSTRIES, LTD.) 430 parts by weight X-22-164 (both ends methacrylic modified silicone compound, manufactured by Shin-Etsu Chemical Co., Ltd.) 0.9 parts by weight IRGACURE 184 (manufactured by BASF Japan Ltd.) 9 parts by weight IRGACURE 819 (manufactured by BASF Japan Ltd.) 9 parts by weight MEGAFACE F-552 (manufactured by DIC Corporation) 0.27 parts by weight SR35M (a MIBK dispersion of ATO particles (solid content 35% by weight), 80 nm in average particle size, manufactured by Advanced Nano Products Co., Ltd.) 1,286 parts by weight (50% by weight (on a solid basis) calculated in terms of ATO particles)

Methyl isobutyl ketone 1,264 parts by weight

Preparation of Laminated Film 24

Laminated film 24 was prepared as in Example 15, except that coating liquid 2-T was used instead of coating liquid 2-K.

Example 25

Preparation of Coating Liquid (Solvent-Based) for Forming Hard Coat Layer

Coating liquid 2-U was prepared having the following composition:

BEAMSET 577 (manufactured by ARAKAWA CHEMICAL INDUSTRIES, LTD.) 430 parts by weight BYK UV-3500 (acrylic modified silicone compound, manufactured by BYK Japan KK) 0.9 parts by weight IRGACURE 184 (manufactured by BASF Japan Ltd.) 9 parts by weight IRGACURE 819 (manufactured by BASF Japan Ltd.) 9 parts by weight MEGAFACE F-552 (manufactured by DIC Corporation) 0.27 parts by weight SR35M (a MIBK dispersion of ATO particles (solid content 35% by weight), 80 nm in average particle size, manufactured by Advanced Nano Products Co., Ltd.) 1,286 parts by weight (50% by weight (on a solid basis) calculated in terms of ATO particles)

Methyl isobutyl ketone 1,264 parts by weight

Preparation of Laminated Film 25

Laminated film 25 was prepared as in Example 15, except that coating liquid 2-U was used instead of coating liquid 2-K.

Example 26

Preparation of Coating Liquid (Solvent-Based) for Forming Hard Coat Layer

Coating liquid 2-V was prepared having the following composition:

BEAMSET 577 (manufactured by ARAKAWA CHEMICAL INDUSTRIES, LTD.) 430 parts by weight TEGO Rad 2010 (acrylic modified silicone compound, manufactured by Evonik Industries) 0.9 parts by weight IRGACURE 184 (manufactured by BASF Japan Ltd.) 9 parts by weight IRGACURE 819 (manufactured by BASF Japan Ltd.) 9 parts by weight MEGAFACE F-552 (manufactured by DIC Corporation) 0.27 parts by weight SR35M (a MIBK dispersion of ATO particles (solid content 35% by weight), 80 nm in average particle size, manufactured by Advanced Nano Products Co., Ltd.) 1,286 parts by weight (50% by weight (on a solid basis) calculated in terms of ATO particles)

Methyl isobutyl ketone 1,264 parts by weight

Preparation of Laminated Film 26

Laminated film 26 was prepared as in Example 15, except that coating liquid 2-V was used instead of coating liquid 2-K.

Comparative Example 1

Preparation of Coating Liquid (Solvent-Free) for Forming Hard Coat Layer

Coating liquid 2-W was prepared having the following composition:

ARONIX M-305 (manufactured by TOAGOSEI CO., LTD.) 600 parts by weight

ARONIX M-220 (manufactured by TOAGOSEI CO., LTD.) 600 parts by weight

BEAMSET 577 (manufactured by ARAKAWA CHEMICAL INDUSTRIES, LTD.) 1,229 parts by weight UF-8001G (manufactured by Kyoeisha Chemical Co., Ltd.) 150 parts by weight SHIKOH UV-7600B (manufactured by The Nippon Synthetic Chemical Industry Co., Ltd.) 300 parts by weight IRGACURE 184 (manufactured by BASF Japan Ltd.) 60 parts by weight IRGACURE 819 (manufactured by BASF Japan Ltd.) 60 parts by weight MEGAFACE F-552 (manufactured by DIC Corporation) 0.9 parts by weight Preparation of Laminated Film 27

Laminated film 27 was prepared as in Example 1, except that coating liquid 2-W was used instead of coating liquid 2-A.

Comparative Example 2

Preparation of Coating Liquid (Solvent-Free) for Forming Hard Coat Layer

Coating liquid 2-X was prepared having the following composition:

ARONIX M-305 (manufactured by TOAGOSEI CO., LTD.) 600 parts by weight

ARONIX M-220 (manufactured by TOAGOSEI CO., LTD.) 600 parts by weight

BEAMSET 577 (manufactured by ARAKAWA CHEMICAL INDUSTRIES, LTD.) 1,229 parts by weight UF-8001G (manufactured by Kyoeisha Chemical Co., Ltd.) 150 parts by weight SHIKOH UV-7600B (manufactured by The Nippon Synthetic Chemical Industry Co., Ltd.) 300 parts by weight EBECRYL 350 (both ends acrylic modified silicone compound, manufactured by DAICEL-ALLNEX LTD.) 0.003 parts by weight IRGACURE 184 (manufactured by BASF Japan Ltd.) 60 parts by weight IRGACURE 819 (manufactured by BASF Japan Ltd.) 60 parts by weight MEGAFACE F-552 (manufactured by DIC Corporation) 0.9 parts by weight Preparation of Laminated Film 28

Laminated film 28 was prepared as in Example 1, except that coating liquid 2-X was used instead of coating liquid 2-A.

Comparative Example 3

Preparation of Coating Liquid (Solvent-Free) for Forming Hard Coat Layer

Coating liquid 2-Y was prepared having the following composition:
ARONIX M-305 (manufactured by TOAGOSEI CO., LTD.) 600 parts by weight
ARONIX M-220 (manufactured by TOAGOSEI CO., LTD.) 600 parts by weight
BEAMSET 577 (manufactured by ARAKAWA CHEMICAL INDUSTRIES, LTD.) 1,079 parts by weight
UF-8001G (manufactured by Kyoeisha Chemical Co., Ltd.) 150 parts by weight
SHIKOH UV-7600B (manufactured by The Nippon Synthetic Chemical Industry Co., Ltd.) 300 parts by weight
EBECRYL 350 (both ends acrylic modified silicone compound, manufactured by DAICEL-ALLNEX LTD.) 150 parts by weight
IRGACURE 184 (manufactured by BASF Japan Ltd.) 60 parts by weight
IRGACURE 819 (manufactured by BASF Japan Ltd.) 60 parts by weight
MEGAFACE F-552 (manufactured by DIC Corporation) 0.9 parts by weight Preparation of Laminated Film 29

Laminated film 29 was prepared as in Example 1, except that coating liquid 2-Y was used instead of coating liquid 2-A.

<<Evaluation of Laminated Films>>

The laminated films prepared as described above were evaluated as described below. Table 2 shows the results.

(Observation of Presence or Absence of Cissing and Pitting)

The total number ($/m^2$) of sites where cissing and pitting occurred was counted by visual observation of each laminated film sample, and the average of the counts for 10 pieces of each laminated film sample was calculated.

(Adhesion of Hard Coat Layer)

Using a mandrel bending tester (Elcometer 1506 manufactured by Elcometer Limited) equipped with a mandrel of 10 mm diameter, each laminated film was bent with its hard coat layer placed outside. Subsequently, the uppermost surface placed outside was cross-cut at intervals of 2 mm with a blade edge at an angle of 90° with respect to the surface by the cross-cut method according to JIS K 5600-5-6:1999, so that a 10-mm-square lattice pattern was formed. Cellophane Tape No. 29 manufactured by Nitto Denko Corporation was attached to the cross-cut surface and then peeled off, after which how the coating flaked off was examined.

F=n1/n×100(%) was calculated, in which n is the number of squares formed by cross-cutting, and n1 is the number of squares in which the coating on the support remains after the peeling off of the tape. The average of the calculated values for 10 pieces of each laminated film sample was evaluated based on the following criteria.
⊙: F≥90%
○: 90%>F≥80%
Δ: 80%>F≥70%
X: 70%>F It is considered that if F is at least 70%, reliable interlayer adhesion can be achieved in practical use.

(Measurement of Haze)

The haze of each laminated film sample was measured using a haze meter (NDH 2000 manufactured by NIPPON DENSHOKU INDUSTRIES CO., LTD.), and the measurements of 10 pieces of each laminated film sample were averaged.

(Evaluation of Durability)

A sunshine weather meter equipped with a carbon arc lamp was used as an accelerated weathering tester, in which 18-minute water spray on each laminated film was repeated during 120-minute light irradiation at an illuminance of 250 W/cm$^2$, a temperature of 40° C., and a humidity of 50% RH. After the irradiation for 2,000 hours, each laminated film was evaluated for scratch resistance and observed for the presence or absence of cracks by the methods described below.

Evaluation of Scratch Resistance

The hard coat layer of each laminated film was rubbed back and forth 50 times with steel wool #0000 under a load of 500 g/cm$^2$ with a stroke of 100 mm at a rate of 30 mm/second. After the rubbing, the surface of the hard coat layer was visually observed and the number of scratches was counted. The average of the counts for 10 pieces of each laminated film sample was evaluated based on the following criteria.
⊙: 0 (not scratched)
○: 1 to 3
○Δ: 4 to 6
Δ: 7 to 10
X: 11 or more The marks ⊙, ○, ○Δ, and Δ indicate that the laminated film is practically usable without any trouble.

Observation of Presence or Absence of Cracks

A 15 cm×5 cm (75 cm$^2$) area of each laminated film sample was visually observed and the number of cracks was counted. The average of the counts for 10 pieces of each laminated film sample was evaluated based on the following criteria.
⊙: 0
○: 1 to 5
○Δ: 6 to 10
Δ: 11 to 25
X: 26 or more The marks ⊙, ○, ○Δ, and Δ indicate that the laminated film is practically usable without any trouble.

TABLE 1

| | | Hard coat layer (applied later) | | |
|---|---|---|---|---|
| | Curable resin | | (Meth)acrylic modified silicone compound | Metal oxide Content particles and content |
| Example 1 | Acrylate 1 (hydroxyl group-free) + acrylate 2 (hydroxyl group-containing) 60:40 | | EBECRYL 350 | 0.001 — |
| Example 2 | Acrylate 1 (hydroxyl group-free) + acrylate 2 (hydroxyl group-containing) 60:40 | | EBECRYL 350 | 0.01 — |
| Example 3 | Acrylate 1 (hydroxyl group-free) + acrylate 2 (hydroxyl group-containing) 60:40 | | EBECRYL 350 | 0.1 — |
| Example 4 | Acrylate 1 (hydroxyl group-free) + acrylate 2 (hydroxyl group-containing) 60:40 | | EBECRYL 350 | 1 — |
| Example 5 | Acrylate 1 (hydroxyl group-free) + acrylate 2 (hydroxyl group-containing) 60:40 | | EBECRYL 350 | 3 — |

TABLE 1-continued

| | | | | |
|---|---|---|---|---|
| Example 6 | Acrylate 1 (hydroxyl group-free) + acrylate 2 (hydroxyl group-containing) 60:40 | EBECRYL 350 | 0.1 | — |
| Example 7 | Acrylate 1 (hydroxyl group-free) + acrylate 2 (hydroxyl group-containing) 60:40 | EBECRYL 350 | 0.1 | — |
| Example 8 | Acrylate 1 (hydroxyl group-free) + acrylate 2 (hydroxyl group-containing) 60:40 | EBECRYL 350 | 0.1 | — |
| Example 9 | Acrylate 1 (hydroxyl group-free) + acrylate 2 (hydroxyl group-containing) 60:40 | EBECRYL 350 | 0.1 | — |
| Example 10 | Acrylate 1 (hydroxyl group-free) + acrylate 2 (hydroxyl group-containing) 60:40 | EBECRYL 350 | 0.1 | SiO2 particles 5 wt % |
| Example 11 | Acrylate 1 (hydroxyl group-free) + acrylate 2 (hydroxyl group-containing) 60:40 | EBECRYL 350 | 0.1 | SiO2 particles 10 wt % |
| Example 12 | Acrylate 1 (hydroxyl group-free) + acrylate 2 (hydroxyl group-containing) 60:40 | EBECRYL 350 | 0.1 | SiO2 particles 50 wt % |
| Example 13 | Acrylate 1 (hydroxyl group-free) + acrylate 2 (hydroxyl group-containing) 60:40 | EBECRYL 350 | 0.1 | SiO2 particles 80 wt % |
| Example 14 | Acrylate 1 (hydroxyl group-free) + acrylate 2 (hydroxyl group-containing) 60:40 | EBECRYL 350 | 0.1 | CeWO3 particles 10 wt % |
| Example 15 | Acrylate 1 (hydroxyl group-free) + acrylate 2 (hydroxyl group-containing) 60:40 | EBECRYL 350 | 0.1 | CeWO3 particles 10 wt % |
| Example 16 | Acrylate 1 (hydroxyl group-free) + acrylate 2 (hydroxyl group-containing) 60:40 | EBECRYL 350 | 0.1 | ITO particles 20 wt % |
| Example 17 | Acrylate 1 (hydroxyl group-free) + acrylate 2 (hydroxyl group-containing) 60:40 | EBECRYL 350 | 0.1 | Gallium zinc oxide particles 50 wt % |
| Example 18 | Acrylate 1 (hydroxyl group-free) + acrylate 2 (hydroxyl group-containing) 60:40 | EBECRYL 350 | 0.1 | Aluminum zinc oxide particles 50 wt % |
| Example 19 | Acrylate 1 (hydroxyl group-free) + acrylate 2 (hydroxyl group-containing) 60:40 | EBECRYL 350 | 0.1 | Zinc antimonate particles 50 wt % |
| Example 20 | Acrylate 1 (hydroxyl group-free) + acrylate 2 (hydroxyl group-containing) 60:40 | EBECRYL 350 | 0.1 | ATO particles 50 wt % |
| Example 21 | Acrylate 1 (hydroxyl group-free) + acrylate 2 (hydroxyl group-containing) 40:60 | EBECRYL 350 | 0.1 | ATO particles 50 wt % |
| Example 22 | Acrylate 1 (hydroxyl group-free) + acrylate 2 (hydroxyl group-containing) 10:90 | EBECRYL 350 | 0.1 | ATO particles 50 wt % |
| Example 23 | Acrylate 2 (hydroxyl group-containing) | EBECRYL 350 | 0.1 | ATO particles 50 wt % |
| Example 24 | Acrylate 2 (hydroxyl group-containing) | X-22-164 | 0.1 | ATO particles 50 wt % |
| Example 25 | Acrylate 2 (hydroxyl group-containing) | BYK UV-3500 | 0.1 | ATO particles 50 wt % |
| Example 26 | Acrylate 2 (hydroxyl group-containing) | TEGO Rad2010 | 0.1 | ATO particles 50 wt % |
| Comparative Example 1 | Acrylate 1 (hydroxyl group-free) + acrylate 2 (hydroxyl group-containing) 60:40 | EBECRYL 350 | 0 | — |
| Comparative Example 2 | Acrylate 1 (hydroxyl group-free) + acrylate 2 (hydroxyl group-containing) 60:40 | EBECRYL 350 | 0.0001 | — |
| Comparative Example 3 | Acrylate 1 (hydroxyl group-free) + acrylate 2 (hydroxyl group-containing) 60:40 | EBECRYL 350 | 5 | — |

| | Hard coat layer (applied later) | | Surfactant-containing layer (applied earlier) | |
|---|---|---|---|---|
| | Solvent | Coating liquid | Surfactant | Coating liquid |
| Example 1 | — | 2-A | Solvent-based | MEGAFACE F-477 | 1-A |
| Example 2 | — | 2-B | Solvent-based | MEGAFACE F-477 | 1-A |
| Example 3 | — | 2-C | Solvent-based | MEGAFACE F-477 | 1-A |
| Example 4 | — | 2-D | Solvent-based | MEGAFACE F-477 | 1-A |
| Example 5 | — | 2-E | Solvent-based | MEGAFACE F-477 | 1-A |
| Example 6 | — | 2-C | Water-based | MEGAFACE F-477 | 1-B |
| Example 7 | MIBK | 2-F | Water-based | MEGAFACE F-477 | 1-B |
| Example 8 | MIBK | 2-F | Water-based | BYK-349 | 1-C |
| Example 9 | MIBK | 2-F | Water-based | SOFTAZOLINE LSB-R | 1-D |
| Example 10 | MIBK | 2-G | Water-based | SOFTAZOLINE LSB-R | 1-D |
| Example 11 | MIBK | 2-H | Water-based | SOFTAZOLINE LSB-R | 1-D |
| Example 12 | MIBK | 2-I | Water-based | SOFTAZOLINE LSB-R | 1-D |
| Example 13 | MIBK | 2-J | Water-based | SOFTAZOLINE LSB-R | 1-D |
| Example 14 | MIBK | 2-K | Water-based | SOFTAZOLINE LSB-R | 1-D |
| Example 15 | MIBK | 2-K | Water-based (reflective layer) | SOFTAZOLINE LSB-R | 1-E |
| Example 16 | MIBK | 2-L | Water-based (reflective layer) | SOFTAZOLINE LSB-R | 1-E |
| Example 17 | MIBK | 2-M | Water-based (reflective layer) | SOFTAZOLINE LSB-R | 1-E |
| Example 18 | MIBK | 2-N | Water-based (reflective layer) | SOFTAZOLINE LSB-R | 1-E |
| Example 19 | MIBK | 2-O | Water-based (reflective layer) | SOFTAZOLINE LSB-R | 1-E |
| Example 20 | MIBK | 2-P | Water-based (reflective layer) | SOFTAZOLINE LSB-R | 1-E |
| Example 21 | MIBK | 2-Q | Water-based (reflective layer) | SOFTAZOLINE LSB-R | 1-E |
| Example 22 | MIBK | 2-R | Water-based (reflective layer) | SOFTAZOLINE LSB-R | 1-E |
| Example 23 | MIBK | 2-S | Water-based (reflective layer) | SOFTAZOLINE LSB-R | 1-E |
| Example 24 | MIBK | 2-T | Water-based (reflective layer) | SOFTAZOLINE LSB-R | 1-E |
| Example 25 | MIBK | 2-U | Water-based (reflective layer) | SOFTAZOLINE LSB-R | 1-E |
| Example 26 | MIBK | 2-V | Water-based (reflective layer) | SOFTAZOLINE LSB-R | 1-E |
| Comparative Example 1 | — | 2-W | Solvent-based | MEGAFACE F-477 | 1-A |
| Comparative Example 2 | — | 2-X | Solvent-based | MEGAFACE F-477 | 1-A |
| Comparative Example 3 | — | 2-Y | Solvent-based | MEGAFACE F-477 | 1-A |

TABLE 2

| | Evaluations | | | | | Durability evaluation |
|---|---|---|---|---|---|---|
| | Cissing and pitting | Heat-shielding properties | HC adhesion | Haze | Scratch resistance | Cracks |
| Example 1 | 20 | Absent | Δ | 0.5 | Δ | ○Δ |
| Example 2 | 15 | Absent | Δ | 0.5 | ○Δ | ○Δ |
| Example 3 | 10 | Absent | Δ | 0.5 | ○ | ○Δ |
| Example 4 | 10 | Absent | Δ | 1 | ○ | ○Δ |
| Example 5 | 10 | Absent | Δ | 1.5 | ○ | ○Δ |
| Example 6 | 8 | Absent | Δ | 0.5 | ○Δ | ○Δ |
| Example 7 | 3 | Absent | Δ | 0.5 | ○Δ | ○ |
| Example 8 | 3 | Absent | Δ | 0.5 | ○Δ | ○ |
| Example 9 | 0 | Absent | Δ | 0.5 | ○Δ | ○ |
| Example 10 | 0 | Absent | ○Δ | 0.6 | ○ | ○ |
| Example 11 | 0 | Absent | ○ | 0.6 | ○ | ○ |
| Example 12 | 0 | Absent | ○ | 0.6 | ○ | ○ |
| Example 13 | 0 | Absent | ○ | 0.6 | ○ | ○Δ |
| Example 14 | 0 | Present | ○ | 0.8 | ○ | ○ |
| Example 15 | 0 | Present | ○ | 0.8 | ○ | ○ |
| Example 16 | 0 | Present | ○ | 0.8 | ○ | ○ |
| Example 17 | 0 | Present | ○ | 0.8 | ○ | ○ |
| Example 18 | 0 | Present | ○ | 0.8 | ○ | ○ |
| Example 19 | 0 | Present | ○ | 0.8 | ○ | ○ |
| Example 20 | 0 | Present | ○ | 0.8 | ⊙ | ○ |
| Example 21 | 0 | Present | ⊙ | 0.8 | ⊙ | ○Δ |
| Example 22 | 0 | Present | ⊙ | 0.8 | ⊙ | ○Δ |
| Example 23 | 0 | Present | ⊙ | 0.8 | ⊙ | ⊙ |
| Example 24 | 0 | Present | ⊙ | 0.8 | ○ | ⊙ |
| Example 25 | 0 | Present | ⊙ | 0.8 | ○ | ⊙ |
| Example 26 | 0 | Present | ⊙ | 0.8 | ○ | ⊙ |
| Comparative Example 1 | 80 | Absent | Δ | 0.5 | X | X |
| Comparative Example 2 | 78 | Absent | Δ | 0.5 | X | X |
| Comparative Example 3 | 10 | Absent | Δ | 5 | ⊙ | X |

The results in Table 2 show that when a laminated film including a substrate, a surfactant-containing layer on one surface of the substrate, and a hard coat layer on the other surface of the substrate is formed according to embodiments of the present invention, the resulting hard coat layer resists cracking and has improved scratch resistance. In the examples according to embodiments of the present invention, various surfactants are used in the surfactant-containing layers. However, the advantageous effect is achieved no matter what surfactant is used.

In contrast, when the hard coat layer contains no or very little (meth)acrylic modified silicone compound as in Comparative Example 1 or 2, cissing or pitting cannot be reduced, so that the laminated film has reduced scratch resistance and suffers from cracking. Also when the content of a (meth)acrylic modified silicone compound in the hard coat layer is too high as in Comparative Example 3, the hard coat layer can also suffer from cracking.

It is also apparent that embodiments of the present invention are effective as mentioned above particularly when the production method used includes forming the surfactant-containing layer on one surface of the substrate, then temporarily winding the substrate into a roll, then unwinding the roll, and then forming the hard coat layer on the substrate as shown in the Examples section.

It is also shown that the surfactant-containing layer containing a water-soluble resin can be formed using an aqueous coating liquid, which helps to reduce coating defects such as cissing and pitting and to contribute to the improvement of the scratch resistance of the hard coat layer.

It is also apparent that when the hard coat layer is formed by applying an organic solvent-containing coating liquid, coating defects such as cissing and pitting are also reduced and the hard coat layer becomes more resistant to cracking.

In addition, when the hard coat layer contains inorganic nanoparticles, the adhesion between the substrate and the hard coat layer is improved. In addition, an infrared-shielding effect (heat-shielding properties) can be imparted to the laminated film when the inorganic nanoparticles used have an infrared-shielding effect. The infrared-shielding effect (heat-shielding properties) can be further improved using a dielectric multilayer coating as the surfactant-containing layer (functional layer).

The present application is based on Japanese Patent Application No. 2014-043933 filed on Mar. 6, 2014, the contents of which are incorporated by reference herein in its entirety.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A laminated film comprising:
   a substrate;
   a surfactant-containing layer that is disposed on one surface of the substrate and contains a surfactant; and
   a hard coat layer disposed on another surface of the substrate, wherein
   the hard coat layer contains 0.001 to 3% by weight of a (meth)acrylic modified silicone compound, and the surfactant-containing layer contains a water-soluble resin.

2. The laminated film according to claim 1, wherein the surfactant is one or more selected from the group consisting of a long chain alkyl group-containing surfactant, a silicon-based surfactant, and a fluorosurfactant.

3. The laminated film according to claim 1, wherein the hard coat layer comprises a product formed by applying an organic solvent-containing coating liquid and then drying the coating.

4. The laminated film according to claim 1, wherein the hard coat layer contains inorganic nanoparticles.

5. The laminated film according to claim 4, wherein the inorganic nanoparticles comprise one or more selected from the group consisting of ATO, ITO, cesium-doped tungsten oxide, gallium zinc oxide, aluminum zinc oxide, and zinc antimonate.

6. The laminated film according to claim 4, wherein the hard coat layer contains 10 to 80% by weight of the inorganic nanoparticles.

7. The laminated film according to claim 1, wherein the hard coat layer comprises a resin component, and a hydroxyl group-containing urethane acrylate makes up at least 50% by weight of the resin component being 100% by weight.

8. The laminated film according to claim 1, wherein the surfactant-containing layer is a dielectric multilayer coating comprising a stack of alternating low and high refractive index layers.

9. A method of producing a laminated film, the method comprising:

forming a surfactant-containing layer on one surface of a substrate to obtain a first laminate, wherein the surfactant-containing layer contains a water-soluble resin;
winding the first laminate into a roll;
unwinding the roll of the first laminate;
applying a coating liquid to a surface of the substrate opposite to its surface on which the surfactant-containing layer is formed in the first laminate, wherein the coating liquid contains 0.001 to 3% by weight of a (meth)acrylic modified silicone compound based on 100% by weight of solids in the coating liquid; and
drying the coating to form a hard coat layer, so that a laminated film is obtained.

10. The laminated film according to claim 2, wherein the hard coat layer comprises a product formed by applying an organic solvent-containing coating liquid and then drying the coating.

11. The laminated film according to claim 2, wherein the hard coat layer contains inorganic nanoparticles.

12. The laminated film according to claim 2, wherein the hard coat layer comprises a resin component, and a hydroxyl group-containing urethane acrylate makes up at least 50% by weight of the resin component being 100% by weight.

13. The laminated film according to claim 2, wherein the surfactant-containing layer is a dielectric multilayer coating comprising a stack of alternating low and high refractive index layers.

14. The laminated film according to claim 3, wherein the hard coat layer contains inorganic nanoparticles.

\* \* \* \* \*